US011340565B2

(12) United States Patent
Ohmura

(10) Patent No.: US 11,340,565 B2
(45) Date of Patent: May 24, 2022

(54) INFORMATION PROCESSING APPARATUS, INFORMATION PROCESSING METHOD, AND PROGRAM

(71) Applicant: SONY CORPORATION, Tokyo (JP)

(72) Inventor: Junki Ohmura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 380 days.

(21) Appl. No.: 16/086,182

(22) PCT Filed: Mar. 3, 2017

(86) PCT No.: PCT/JP2017/008417
§ 371 (c)(1),
(2) Date: Sep. 18, 2018

(87) PCT Pub. No.: WO2017/195440
PCT Pub. Date: Nov. 16, 2017

(65) Prior Publication Data
US 2020/0301377 A1 Sep. 24, 2020

(30) Foreign Application Priority Data

May 12, 2016 (JP) .............................. JP2016-095949

(51) Int. Cl.
*G05B 15/02* (2006.01)
*G10L 15/18* (2013.01)

(52) U.S. Cl.
CPC .......... *G05B 15/02* (2013.01); *G10L 15/1815* (2013.01)

(58) Field of Classification Search
CPC ............ G05B 15/02; G05B 2219/2642; G10L 15/1815; G06F 3/01; G06F 13/00
See application file for complete search history.

(56) References Cited

U.S. PATENT DOCUMENTS

| 5,657,425 | A | 8/1997 | Johnson | |
|---|---|---|---|---|
| 9,275,734 | B2* | 3/2016 | Inoue | ................. G06F 16/24532 |
| 2015/0058773 | A1* | 2/2015 | Sasaki | .................. G06F 3/0488 |
| | | | | 715/769 |
| 2015/0286943 | A1* | 10/2015 | Wang | .................. G06F 3/04842 |
| | | | | 706/11 |
| 2015/0309483 | A1 | 10/2015 | Lyman et al. | |
| 2018/0204432 | A1* | 7/2018 | Phillips | ................... H04L 67/12 |

FOREIGN PATENT DOCUMENTS

| CN | 101782768 A | 7/2010 |
|---|---|---|
| CN | 101969718 A | 2/2011 |
| CN | 104714504 A | 6/2015 |
| CN | 105159107 A | 12/2015 |

(Continued)

*Primary Examiner* — Mohammad Ali
*Assistant Examiner* — Sheela Rao
(74) *Attorney, Agent, or Firm* — Paratus Law Group, PLLC

(57) ABSTRACT

There is provided an information processing apparatus to make it possible to perform an output more appropriate for the user, the information processing apparatus including: a memory section configured to store control information in which a region, an action, and content of control of apparatus output are associated; and a processing section configured to perform output on a basis of a region where a user is located, an action of the user, and the control information.

16 Claims, 17 Drawing Sheets

(56) References Cited

FOREIGN PATENT DOCUMENTS

| | | |
|---|---|---|
| CN | 105425602 A | 3/2016 |
| JP | H10-111698 A | 4/1998 |
| JP | 2006-324876 A | 11/2006 |
| JP | 2009-087074 A | 4/2009 |
| JP | 2011-055121 A | 3/2011 |
| JP | 2011-061247 A | 3/2011 |
| JP | 2015-146514 A | 8/2015 |

* cited by examiner

FIG. 9

| MODE | OUTPUT NOT ALLOWED |
|---|---|
| NIGHTTIME MODE | • BGM PLAYING |
| HOLIDAY MODE | • CONFIRMATION OF SETTING OF ALARM CLOCK |
| WORK MODE | • BGM PLAYING |
| VISITOR MODE | • RUNNING OF SLIDE SHOW OF FAMILY PHOTOGRAPHS<br>• MESSAGE PLAYING |

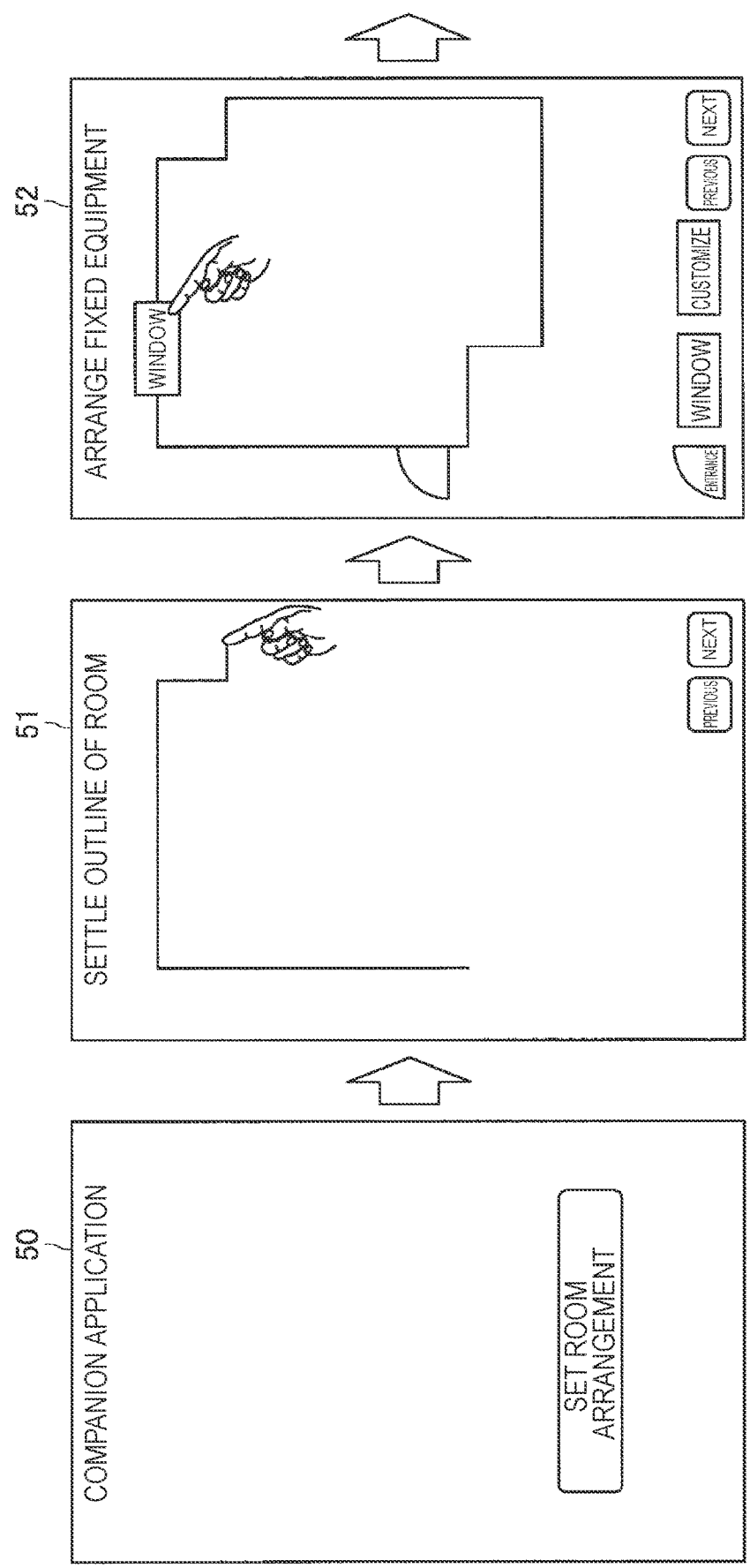

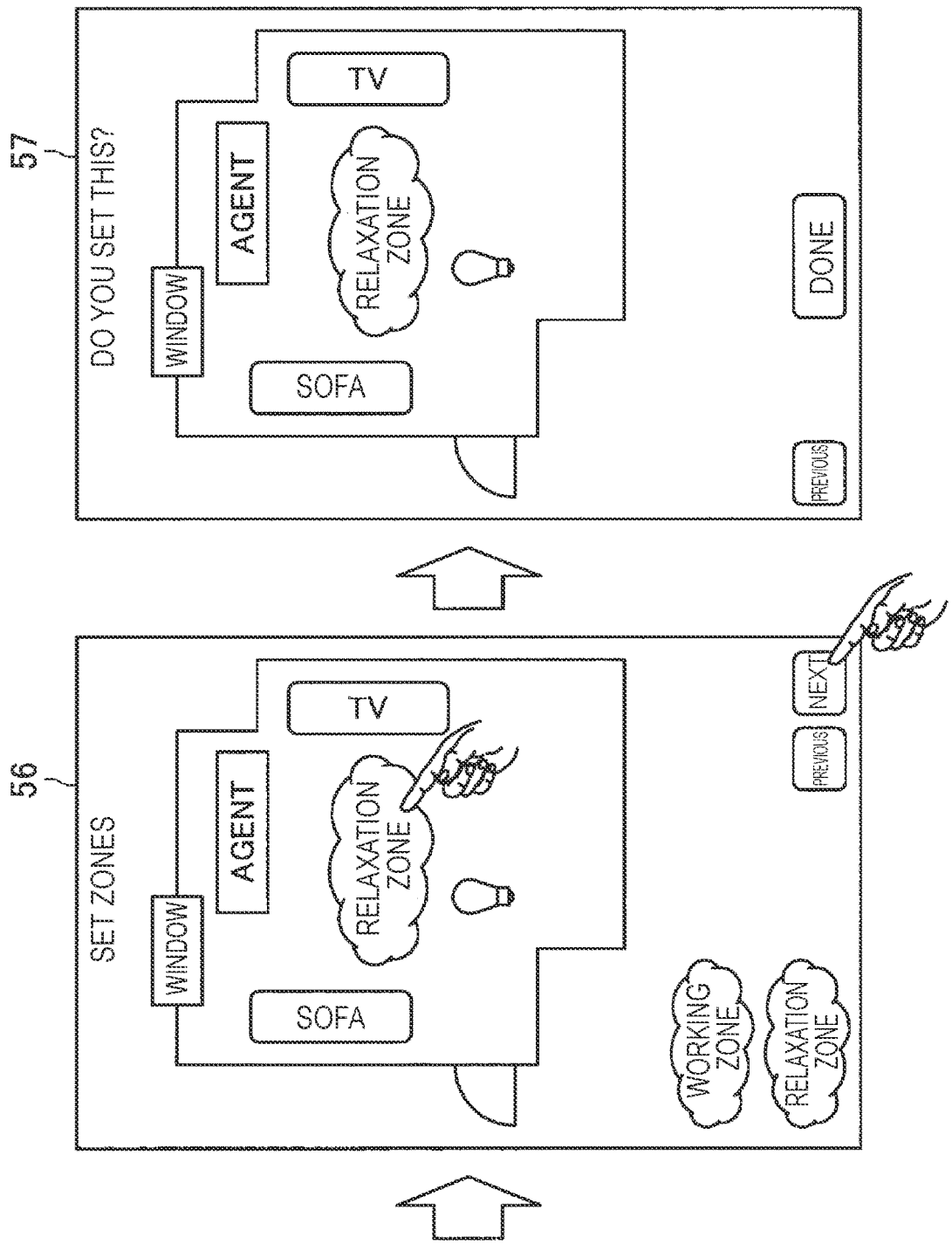

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/008417 (filed on Mar. 3, 2017) under 35 U.S.C. §371, which claims priority to Japanese Patent Application No. 2016-095949 (filed on May 12, 2016), which are all hereby incorporated by reference in their entirety.

TECHNICAL FIELD

The present disclosure relates to an information processing apparatus, an information processing method, and a program.

BACKGROUND ART

These days, information processing apparatuses that perform output in accordance with the user or the environment surrounding the user are researched and developed actively. Patent Literature 1 below discloses a technology in which design can be performed easily in a voice conversation system that performs output in accordance with the voice of the user.

CITATION LIST

Patent Literature

Patent Literature 1: JP H10-111698A

DISCLOSURE OF INVENTION

Technical Problem

Here, if output is performed in accordance with the action of the user, there is a possibility that an output appropriate for the user will not be performed. For example, in a case where the user is reading a textbook at a desk and in a case where the user is reading a magazine in a living room, in both cases the information processing apparatus may recognize that the same action of "reading" is being performed and may perform the same output of "turn off the power source of a television." Here, in a case where a user who is reading a magazine in a living room also wants to watch television, the output of "turn off the power source of the television" is not appropriate.

Thus, the present disclosure has been made in view of the foregoing, and the present disclosure presents a new and improved information processing apparatus, a new and improved information processing method, and a new and improved program that can perform an output more appropriate for the user.

Solution to Problem

According to the present disclosure, there is provided an information processing apparatus including: a memory section configured to store control information in which a region, an action, and content of control of apparatus output are associated; and a processing section configured to perform output on a basis of a region where a user is located, an action of the user, and the control information.

In addition, according to the present disclosure, there is provided a program for causing a computer to execute: a function of storing control information in which a region, an action, and content of control of apparatus output are associated; and a function of performing output on a basis of a region where a user is located, an action of the user, and the control information.

In addition, according to the present disclosure, there is provided a processing method to be executed by a computer, including: storing control information in which a region, an action, and content of control of apparatus output are associated; and performing output on a basis of a region where a user is located, an action of the user, and the control information.

Advantageous Effects of Invention

As described above, according to the present disclosure, it becomes possible to perform an output more appropriate for the user.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 9 is a diagram showing an example of mode setting.

FIG. 12A is a diagram showing an example of region setting using a companion application.

FIG. 12C is a diagram showing an example of region setting using a companion application.

MODE(S) FOR CARRYING OUT THE INVENTION

Figure 1:
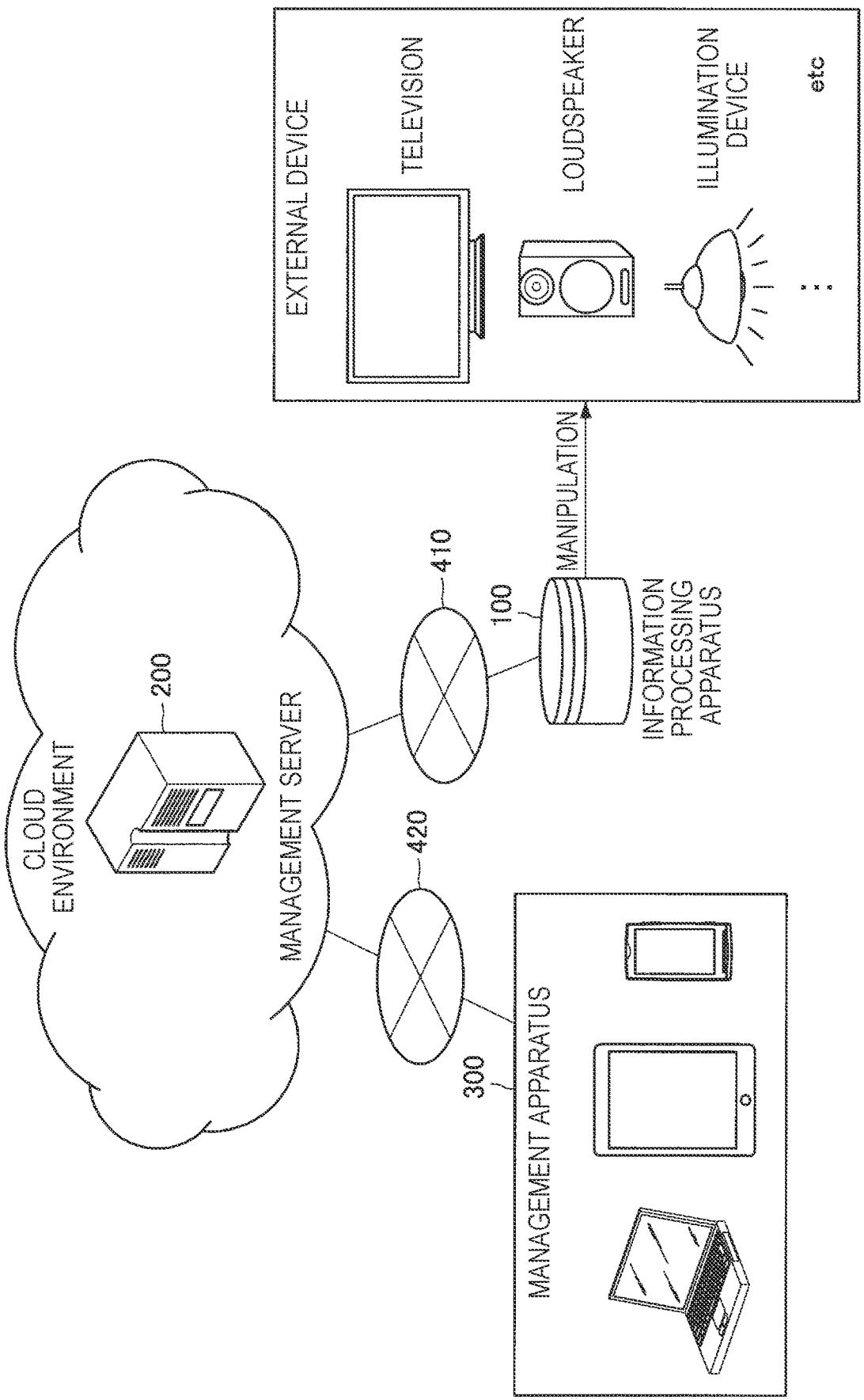
FIG. 1 is a diagram showing an overview of an information system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Introduction
2. Embodiment of present disclosure
2-1. Overview of information processing system
2-2. Configuration of each apparatus
3. Details of control information
3-1. Content of set control information
3-2. Methods for setting control information
3-3. Operations of information processing apparatus based on control information
3-4. Setting of regions
4. Use of histories
5. Hardware configuration of information processing apparatus

1. Introduction

First, these days, information processing apparatuses that perform output to persons and devices autonomously are evolving in association with the evolution of image analysis technology, artificial intelligence (AI) technology, or sensing devices. For example, in regard to an agent that is a software application that senses the user or the situation surrounding the user by means of a sensor and performs output, an agent that performs output on the basis of a program and a setting registered in advance has conventionally been at the center. On the other hand, these days, artificial intelligence technology is utilized, and an agent that performs machine learning and autonomously alters a program or a setting registered in advance, and thereby operates just like a human being or operates rationally is being researched and developed actively.

As examples, the following agents are researched and developed.

Buyer agent: an agent that, on the basis of a purchase history of the user, searches for a commercial product that the user is presumably fond of, from the Internet or the like, and presents the result to the user spontaneously Personal agent: an agent that operates exclusively for the user as an individual; an agent that searches for information related to the user from news, e-mail, etc., and presents the result to the user spontaneously Monitoring agent: an agent that monitors changes of devices, stock, etc., and reports faults of devices, the exhaustion of stock, etc.

Data mining agent: an agent that analyzes a large amount of data, and outputs useful laws and information An information processing apparatus that is described as an embodiment of the present disclosure is an apparatus functioning as an agent.

2. Embodiment of Present Disclosure

[2-1. Overview of Information Processing System]

Next, an overview of an information processing system according to an embodiment of the present disclosure is described with reference to FIG. 1. FIG. 1 is a diagram showing an overview of an information system according to an embodiment of the present disclosure. The information processing system includes an information processing apparatus 100, a management server 200, a management apparatus 300, and an external device that is manipulated by the information processing apparatus 100. Further, the management server 200 exists on a cloud environment; the information processing apparatus 100 and the management server 200 are connected by a network 410, and the management server 200 and the management apparatus 300 are connected by a network 420. The external device is arbitrary as long as it is a device provided with an interface that is manipulated by the information processing apparatus 100. Specifically, the external device may be a television, a loudspeaker, an illumination device, etc., and the external device may be a device integrated with the information processing apparatus 100.

The information processing apparatus 100 is an apparatus that performs output in accordance with the result of detection of the user or the environment surrounding the user. Specifically, the information processing apparatus 100 detects the user or the situation surrounding the user, and performs output on the basis of control information that includes the conditions of output and the content of output. The output includes not only processing by the information processing apparatus 100, but also the transmission of information regarding processing to an external device by the information processing apparatus 100, which transmission is in order to cause the external device to perform the processing. Further, the information processing apparatus 100 is connected to the management server 200 via the network 410, and thereby transmits control information, histories, user information, etc. to the management server 200. The transmitted various pieces of information are used for the management of the information processing apparatus 100 by the management server 200 and the improvement of analysis algorithms by machine learning. Further, the information processing apparatus 100 transmits notification regarding the user to the management server 200. The transmitted notification is transmitted to the management apparatus 300 by the management server 200, and is thereby provided to the user.

The information processing apparatus 100 has various detection functions in order to detect the user or the situation surrounding the user. For example, the information processing apparatus 100 has a sound pickup function such as a microphone, an imaging function such as a camera, etc. Further, external devices having these detection functions may provide detected information to the information processing apparatus 100, and the information processing apparatus 100 may perform output on the basis of the provided information.

Although the shape of the information processing apparatus 100 shown in FIG. 1 is a circular columnar shape, the shape of the information processing apparatus 100 is arbitrary. Further, the installation place of the information processing apparatus 100 is arbitrary. For example, the information processing apparatus 100 may be installed in houses, offices, commercial facilities, public facilities, transportation facilities, etc. An example in which the information processing apparatus 100 is installed in a house will now be described as an embodiment of the present disclosure. Further, the information processing apparatus 100 may be a stationary apparatus, or may be a self-propelled apparatus such as a robot.

Figure 2:
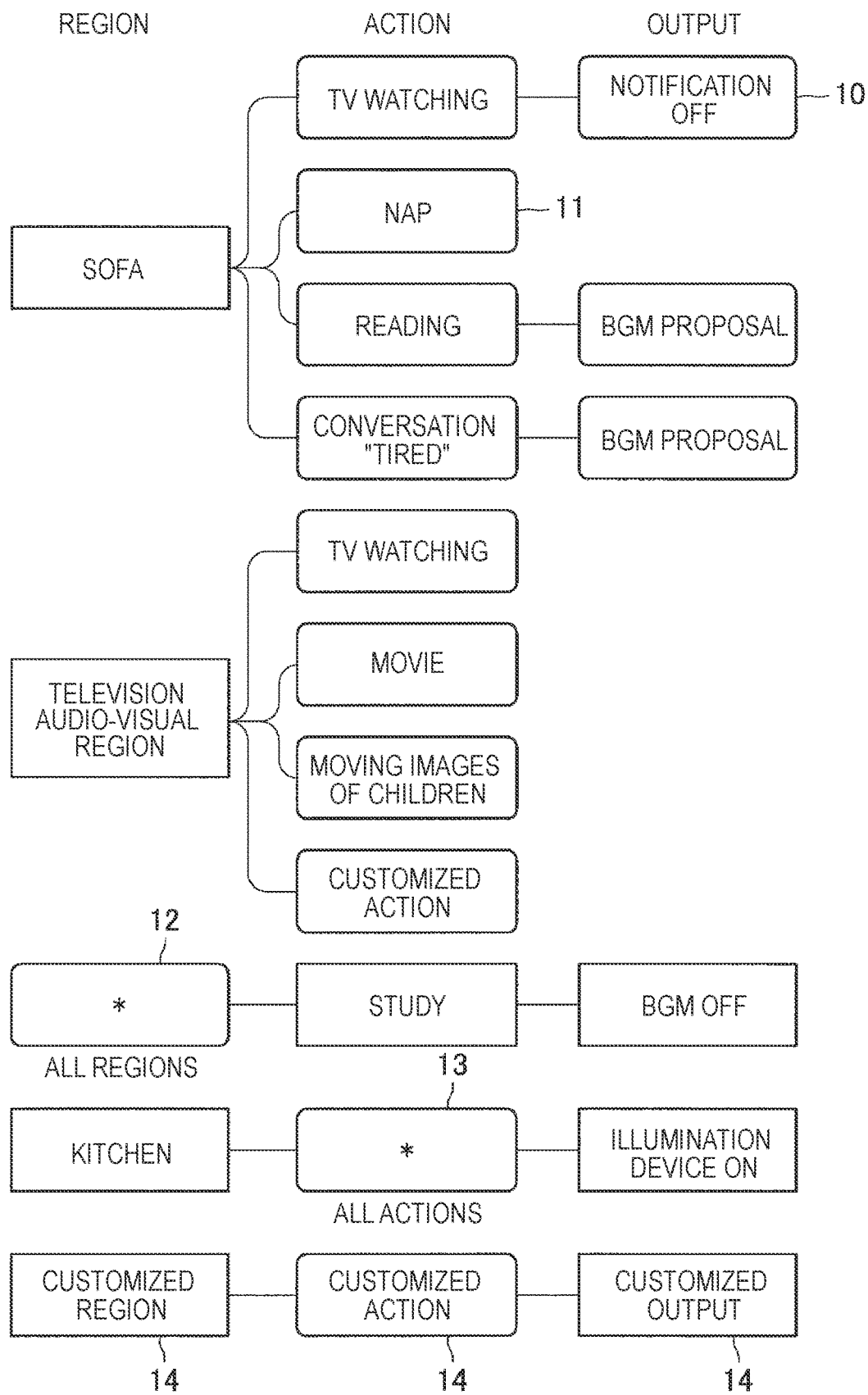
FIG. 2 is a diagram showing an example of control information.

Here, an overview of control information that is used by the information processing apparatus 100 is described with reference to FIG. 2. FIG. 2 is a diagram showing an example of control information. As shown in FIG. 2, the control information is information in which a "region," an "action," and "the content of control of apparatus output" are linked. The region is information regarding the position of the user, and the action is information regarding the action of the user. If the information processing apparatus 100 detects the fact that the user is located in a region corresponding to control information and is performing an action corresponding to the control information, the information processing apparatus 100 performs an output linked to the region and the action. For example, in a case of control information 10 of FIG. 2, if the information processing apparatus 100 detects the fact that the user is watching television on a sofa, the information processing apparatus 100 turns off the function of notification to the user. Details of control information are described later.

Figure 3:
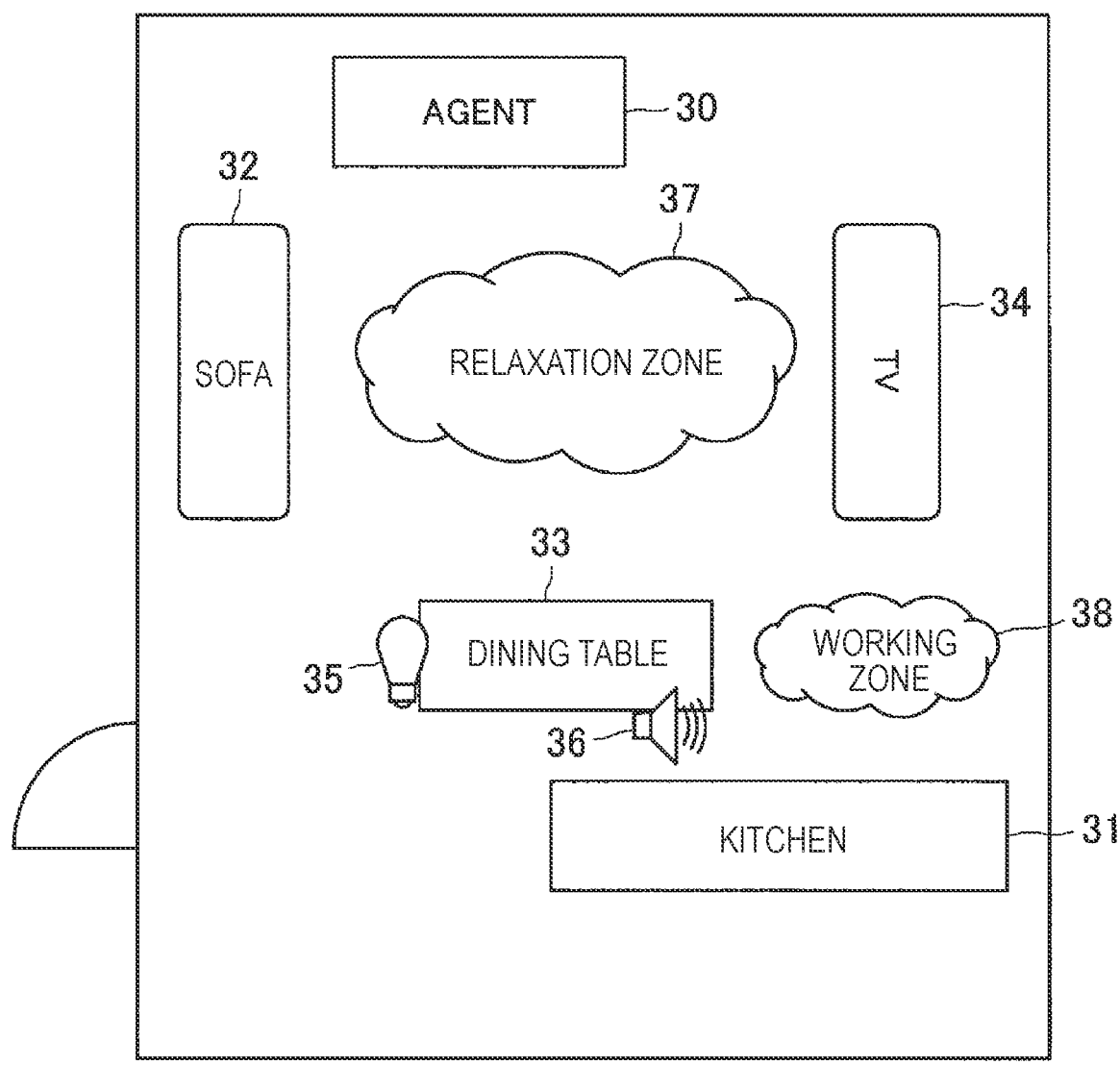
FIG. 3 is a diagram showing an overview of regions used for determination of a region where a user is located.

Next, an overview of the region where the user is located is described with reference to FIG. 3. FIG. 3 is a diagram showing an overview of regions used for the determination of the region where the user is located. In an embodiment of the present disclosure, it is assumed that the information processing apparatus 100 is installed in a room of a house. Then, the region in an embodiment of the present disclosure may be a region in the plot where the information processing apparatus 100 is installed (in the plot of the house).

In the example shown in FIG. 3, a plurality of regions in the room includes fixed equipment (a kitchen 31), furniture (a sofa 32 and a dining table 33), home electrical appliances (a television 34, an illumination device 35, and a loudspeaker 36), and zones (a relaxation zone 37 and a working zone 38). The zone is a kind of constituent part of the room defined by the user. AGENT 30 in FIG. 3 represents the information processing apparatus 100.

Here, in a case where the user is in the kitchen 31, the region where the user is located is the "kitchen"; in a case where the user is sitting on the sofa 32, the region where the user is located is the "sofa"; in a case where the user is in the working zone 38, the region where the user is located is the "working zone." Further, in a case where the user is in an audio-visual region of the television 34, the region where the user is located is "the audio-visual region of the television." Thus, prescribed regions may be set for fixed equipment, furniture, and home electrical appliances in accordance with the manner in which the user uses them. Specifically, the prescribed region is a region that is illuminated with the illumination device 35, a region to which the loudspeaker 36 is directed, etc.

The management server 200 is an apparatus that manages the information processing apparatus 100. Specifically, the management server 200 is connected to the information processing apparatus 100 via the network 410, and thereby manages control information, histories, user information, etc. transmitted from the information processing apparatus 100. The number of information processing apparatuses 100 managed by the management server 200 is arbitrary. Further, the management server 200 may manage information processing apparatuses 100 owned by different owners. Further, the management server 200 performs machine learning on the basis of these pieces of information, and thereby performs the alteration of control information and the improvement of analysis algorithms.

The management server 200 provides various pieces of information to the management apparatus 300. Specifically, the management server 200 is connected to the management apparatus 300 via the network 420, and thereby provides control information, histories, user information, or notification to the management apparatus 300. Thereby, using the management apparatus 300, the user can manage the information processing apparatus 100, or acquire notification.

The cloud environment in which the management server 200 is installed may be a public cloud, or may be a private cloud. Further, the management server 200 may not be installed in a cloud environment (that is, may not be virtualized).

The management apparatus 300 is an apparatus for the user to manage the information processing apparatus 100. Specifically, the management apparatus 300 is connected to the management server 200 via the network 420, and thereby manages control information, histories, user information, etc. For example, using the management apparatus 300, the user can alter control information, input a correction of a history, amend a history, and edit user information. These pieces of information are provided to the management server 200 and the information processing apparatus 100. Further, the management apparatus 300 can receive notification via the management server 200.

Although not illustrated, the management apparatus 300 may be connected to the information processing apparatus 100 by a network. Thereby, the management apparatus 300 can perform communication with the information processing apparatus 100 without passing through the management server 200, and can therefore reduce the influence of network trouble, delay, etc.

Although the apparatuses shown as the management apparatus 300 in FIG. 1 are a personal computer (PC), a tablet device, and a smartphone, the management apparatus 300 is an arbitrary apparatus. For example, the management apparatus 300 may be a wristwatch equipped with a communication function, a personal digital assistant (PDA), a portable game machine equipped with a communication function, a portable video player equipped with a communication function, an audio player equipped with a communication function, or the like.

The networks 410 and 420 are wired or wireless sending paths for information transmitted from the information processing apparatus 100, the management server 200, and the management apparatus 300. For example, the networks 410 and 420 may include public networks such as the Internet, a telephone network, and a satellite communication network, various local area networks (LANs) including Ethernet (registered trademark), a wide area network (WAN), etc. Further the networks 410 and 420 may include a leased line network such as an Internet protocol-virtual private network (IP-VPN), and a short-distance wireless communication network such as Bluetooth (registered trademark).

[2-2. Configuration of Each Apparatus]

Figure 4:
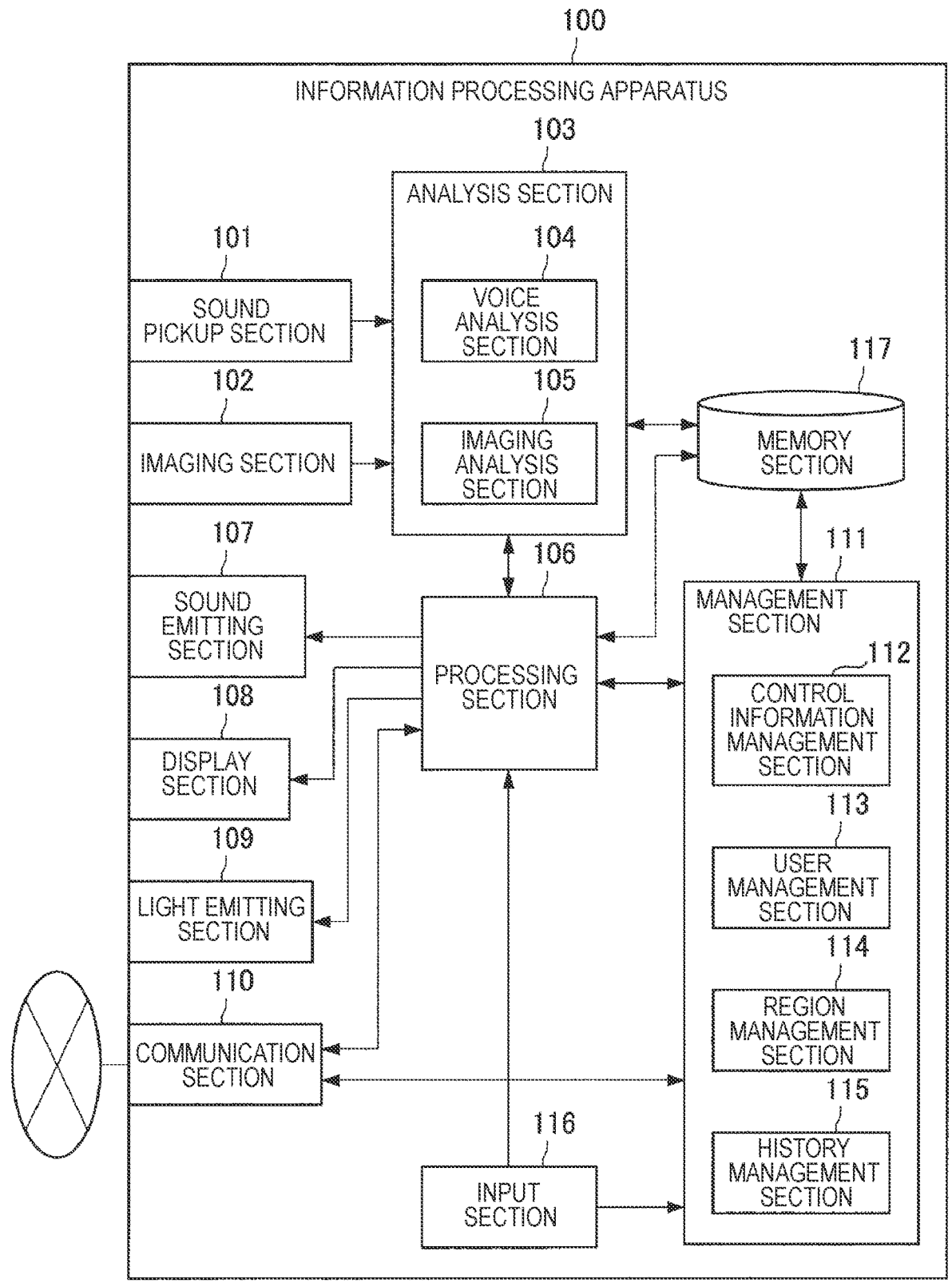
FIG. 4 is a diagram showing a configuration of an information processing apparatus according to an embodiment of the present disclosure.
Figure 5:
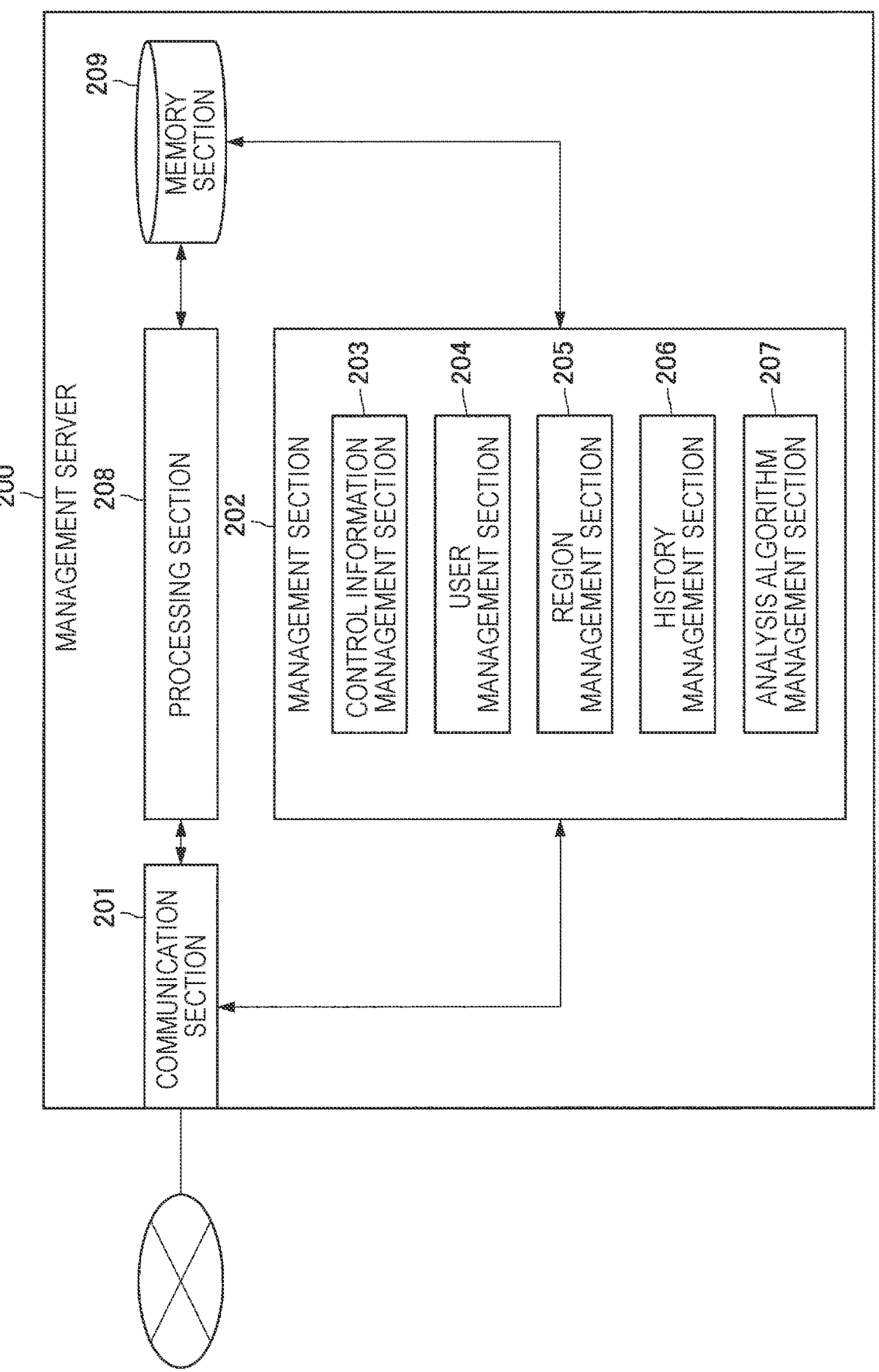
FIG. 5 is a diagram showing a configuration of a management server according to an embodiment of the present disclosure.
Figure 6:
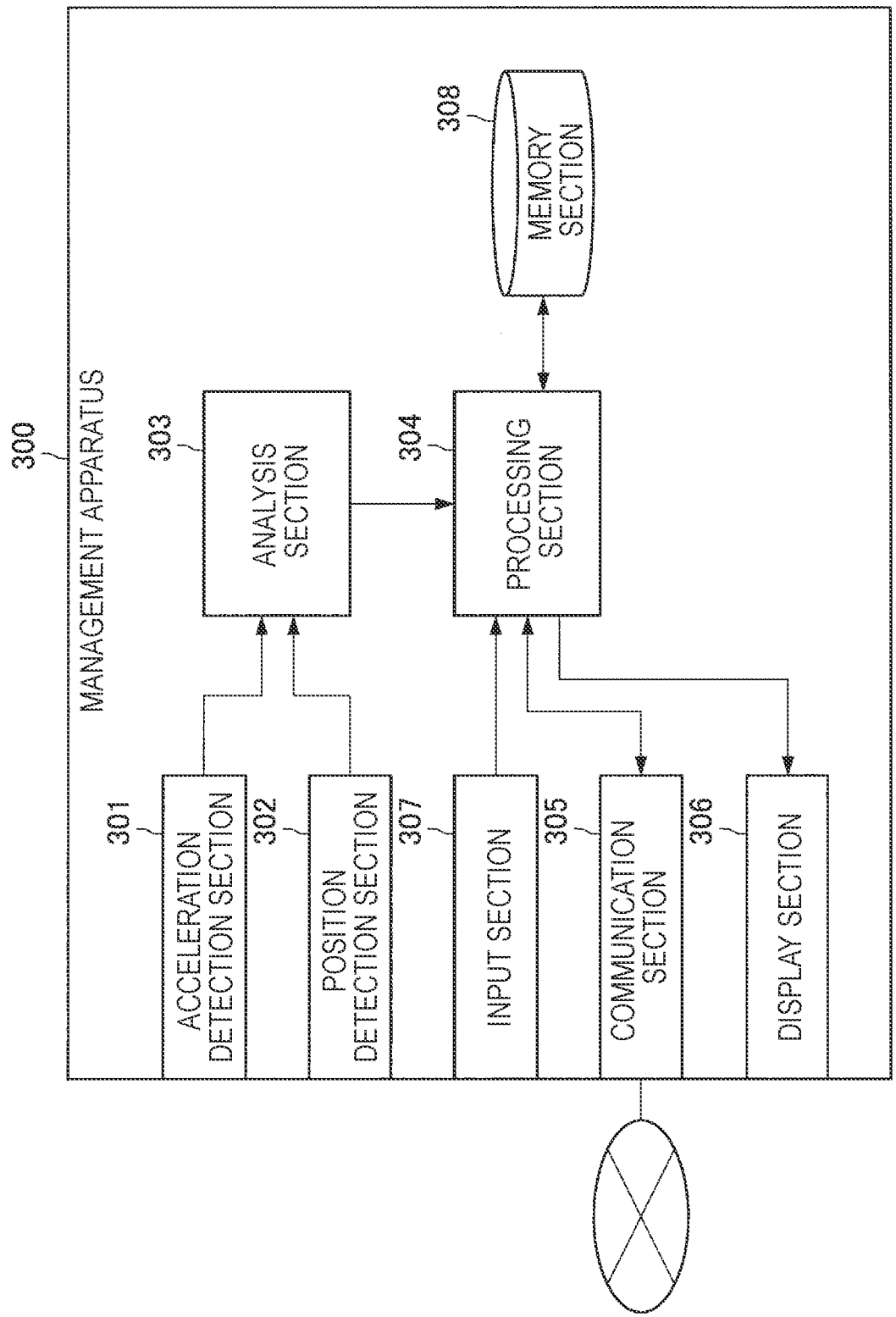
FIG. 6 is a diagram showing a configuration of a management apparatus according to an embodiment of the present disclosure.

Hereinabove, an overview of an information processing system is described. Next, the configuration of each apparatus included in the information processing system is described with reference to FIG. 4.

First, the configuration of the information processing apparatus 100 is described. The information processing apparatus 100 includes a sound pickup section 101, an imaging section 102, an analysis section 103, a processing section 106, a sound emitting section 107, a display section 108, a light emitting section 109, a communication section 110, a management section 111, an input section 116, and a memory section 117. The analysis section 103 includes a voice analysis section 104 and an imaging analysis section 105. The management section 111 includes a control information management section 112, a user management section 113, a region management section 114, and a history management section 115.

The sound pickup section 101 picks up sounds around the information processing apparatus 100, and provides the sounds to the voice analysis section 104, as an audio signal.

The imaging section 102 images the surroundings of the information processing apparatus 100, and provides a generated captured image to the imaging analysis section 105.

The voice analysis section 104 recognizes a voice of the user from an audio signal provided from the sound pickup section 101, and performs the conversion of the voice to a character string to acquire an utterance text. Then, the voice analysis section 104 performs natural language processing or the like on the utterance text, and thereby performs semantic factoring. The result of semantic factoring is provided to the processing section 106. Further, the voice analysis section 104 can discriminate a user uttering a voice on the basis of features of the recognized voice, and can estimate the source of the voice, that is, the direction of the utterer.

The imaging analysis section 105 analyzes a captured image provided from the imaging section 102, and thereby determines the user, regions (fixed equipment, furniture, home electrical appliances, or zones), the region where the user is located, and the action of the user. The method for determining these is arbitrary, and an example is described below.

For the method for determining the user, the imaging analysis section 105 may calculate the degree of similarity by pattern matching between a captured image and a face image of the user registered in advance, and may determine the user on the basis of the degree of similarity. In this case, the imaging analysis section 105 may calculate normalized cross-correlation values between the captured image and the registered face image while changing the relative position of the registered face image with respect to the captured image, and may take the maximum value of the normalized cross-correlation values as the degree of similarity between the captured image and the registered face image.

For the method for determining the region where the user is located, the imaging analysis section 105 may determine the region in a similar manner to the method for determining the user. Specifically, the imaging analysis section 105 may calculate the degree of similarity by pattern matching between a captured image and an object image registered in advance, and may determine the object on the basis of the degree of similarity. In this case, the imaging analysis section 105 may calculate normalized cross-correlation values between the captured image and the registered object image while changing the relative position of the registered object image with respect to the captured image, and may take the maximum value of the normalized cross-correlation values as the degree of similarity between the captured image and the registered object image.

Then, the imaging analysis section 105 determines the region where the user is located, on the basis of the relative positional relationship between the user and the object determined in the above. For example, in a case where the imaging analysis section 105 determines the object as a sofa and the user is on the sofa, the imaging analysis section 105 determines that the region where the user is located is the sofa.

Further, in a case where the imaging analysis section 105 determines that the object is an object of which the region needs to be calculated separately, such as a television, the imaging analysis section 105 performs the calculation of the region. For example, the imaging analysis section 105 calculates the visual-audio region of the television from the orientation of the television, the installation position of the television, etc. After that, in a case where the determined user is included in the calculated visual-audio region of the television, the imaging analysis section 105 determines that the region where the user is located is the visual-audio region of the television.

For the method for determining the action of the user, the imaging analysis section 105 may determine the action of the user in a similar manner to the method for determining the user. Specifically, the imaging analysis section 105 may calculate the degree of similarity by pattern matching between captured images and action images registered in advance, and may determine the object on the basis of the degree of similarity. Here, the action images refer to a plurality of captured images in which the user who is performing the action is imaged on a time-series basis. In this case, the imaging analysis section 105 performs pattern matching between time-series changes of parts included in the user in the captured images and time-series changes of parts included in the user in the action images. Then, the imaging analysis section 105 provides information of the determined action of the user to the processing section 106.

The processing section 106 performs output on the basis of input from the analysis section 103 and control information. Specifically, in a case where, in the control information, there is an output corresponding to the region where the user is located and the action of the user, which are provided from the imaging analysis section 105, the processing section 106 controls each configuration so as to perform the relevant output. The processing section 106 may perform output by controlling the sound emitting section 107, the display section 108, and the light emitting section 109, or output may be performed by an external device by providing information regarding the output to the external device via the communication section 110.

The sound emitting section 107 converts an audio signal to a voice and outputs the voice, by being controlled by the processing section 106.

The display section 108 displays various images by being controlled by the processing section 106. For example, the display section 108 may display a manipulation image for the user to manipulate the information processing apparatus 100 on a graphical user interface (GUI), and may display images, video images, and the like. The displaying method may be a method of displaying on a display, or may be a method of displaying by projection on a wall or the like.

The light emitting section 109 includes a light emitting element, and can perform full lighting, partial lighting, blinking, the alteration of the lighting position, etc., by being controlled by the processing section 106. For example, the light emitting section 109 can make its visual line seem to be directed in the direction of the user by partially lighting the direction of the user, which direction is recognized by the analysis section 103, by being controlled by the processing section 106.

The communication section 110 performs communication with the management server 200 and external devices. For example, in a case where the editing of control information, histories, or user information has been performed by the user, the communication section 110 transmits the editing content to the management server 200. Further, the communication section 110 obtains synchronization with the management server 200 by performing the transmission and reception of various pieces of information with the management server 200 at an arbitrary timing or a fixed timing.

Further, the communication section 110 transmits, to an external device, information regarding output provided from the processing section 106, and thereby enables the external device to perform output. Furthermore, in a case where the communication section 110 has received information detected by an external device, the communication section 110 provides the information to the processing section 106. Thereby, the information processing apparatus 100 can perform output on the basis of the detection function included in the external device.

The control information management section 112 manages control information. Specifically, in a case where the user performs the editing (new addition, alteration, or deletion) of control information via the input section 116, the control information management section 112 functions also as a setting section that performs the editing of the control information on the basis of the editing content. Further, in a case where the control information management section 112 performs synchronization with the management server 200 via the communication section 110, the control information management section 112 performs the synchronization of control information. Then, the control information management section 112 causes the control information that has undergone editing or synchronization to be stored in the memory section 117.

The user management section 113 manages information of the user who uses the information processing system. For example, in a case where the user performs the editing of user information via the input section 116, the user management section 113 performs the editing of the user information on the basis of the editing content. Further, in a case where the user management section 113 performs synchronization with the management server 200 via the communication section 110, the user management section 113 performs the synchronization of user information. Then, the user management section 113 causes the user information that has undergone editing or synchronization to be stored in the memory section 117.

The region management section 114 manages regions. For example, in a case where the user performs the editing of regions via the input section 116, the region management section 114 performs the editing of the regions on the basis of the editing content. Further, in a case where the region management section 114 performs synchronization with the management server 200 via the communication section 110, the region management section 114 performs the synchronization of regions. Then, the region management section 114 causes the regions that have undergone editing or synchronization to be stored in the memory section 117. Further, in a case where the editing of regions is performed on the basis of the result of imaging by the imaging section 102, the region management section 114 receives information regarding the analysis result of the captured image, and edits the regions. Then, the region management section 114 causes the regions after editing to be stored in the memory section 117.

The history management section 115 manages histories regarding outputs of the processing section 106. For example, the history management section 115 causes the information of the date and time when output is performed, the region where the user is located, the action of the user, the content of output, etc. to be stored as a history in the memory section 117.

Further, the history management section 115 functions also as a history editing section that performs the editing of histories. Specifically, in a case where the user has inputted a correction of a history or an amendment of a history via the input section 116, the history management section 115 edits the history on the basis of the input. Further, in a case where the history management section 115 performs synchronization with the management server 200 via the communication section 110, the history management section 115 performs the synchronization of histories. Then, the history management section 115 causes the histories that have undergone editing or synchronization to be stored in the memory section 117.

The input section 116 accepts various inputs from the user. For example, the input section 116 accepts the content of editing on control information, regions, histories, user information, etc. that is inputted by the user, and provides the information to the management section 111. Further, the input section 116 functions also as an acquisition section that acquires input by the user for the setting of control information.

The memory section 117 stores the various pieces of information described above. Specifically, the memory section 117 stores control information, user information, regions, histories, etc.

Next, the configuration of the management server 200 is described. The management server 200 includes a communication section 201, a management section 202, a processing section 208, and a memory section 209. The management section 202 includes a control information management section 203, a user management section 204, a region management section 205, a history management section 206, and an analysis algorithm management section 207.

The communication section 201 performs communication with the information processing apparatus 100 and the management apparatus 300. For example, in a case where control information, regions, histories, user information, etc. are edited from the information processing apparatus 100 or the management apparatus 300, the communication section 201 receives information of the editing content, and provides the information to the management section 202. Thereby, various pieces of information of the management server 200 are edited.

Further, the communication section 201 performs the transmission and reception of control information, regions, histories, and user information with the information processing apparatus 100 and the management apparatus 300 at an arbitrary timing or a fixed timing, and thereby obtains synchronization with the information processing apparatus 100 and the management apparatus 300.

Further, the communication section 201 transmits notification to the management apparatus 300 on the basis of information regarding notification provided from the processing section 208.

The control information management section 203, the user management section 204, the region management section 205, and the history management section 206 manage control information, user information, regions, and histories, respectively. In a case where the communication section 201 has received information of editing content of each piece of information, the communication section 201 performs the editing of each piece of information on the basis of the editing content, and causes the information after editing to be stored in the memory section 209.

The analysis algorithm management section 207 manages algorithms for analysis. Specifically, the analysis algorithm management section 207 manages an algorithm for voice analysis that is used by the voice analysis section 104 of the information processing apparatus 100 and an algorithm for image analysis that is used by the imaging analysis section 105. In a case where the communication section 201 has received feedback such as a correction of a history or an amendment of a history from the information processing apparatus 100 or the management apparatus 300, the analysis algorithm management section 207 improves an algorithm for analysis on the basis of the content of the feedback, and provides the algorithm after improvement to the information processing apparatus 100.

The processing section 208 performs each piece of processing in the management server 200. For example, in a case where the communication section 201 has received a notification of the user from the information processing apparatus 100, the processing section 208 causes the notification to be stored in the memory section 209, and causes the notification to be transmitted to the management apparatus 300 via the communication section 201. These pieces of processing are examples, and the processing section 208 may perform arbitrary processing.

The memory section 209 stores the various pieces of information described above. Specifically, the memory section 209 stores control information, user information, regions, histories, analysis algorithms, notifications, etc.

Next, the management apparatus 300 is described. The management apparatus 300 includes an acceleration detection section 301, a position detection section 302, an analysis section 303, a processing section 304, a communication section 305, a display section 306, an input section 307, and a memory section 308.

The acceleration detection section 301 detects the acceleration of the management apparatus 300, and provides information of the acceleration to the analysis section 303.

The position detection section 302 detects the position of the management apparatus 300. Specifically, the acceleration detection section 301 receives a Global Positioning System (GPS) signal, and provides the GPS signal to the analysis section 303.

The analysis section 303 analyzes various pieces of information provided from the acceleration detection section 301 and the position detection section 302. Specifically, the analysis section 303 analyzes information regarding the acceleration of the management apparatus 300 provided from the acceleration detection section 301 and determines the action of the user. For example, the analysis section 303 determines that the user is at a stop, is walking, is running, or is on various transportation facilities (a car, a train, a bus, an airplane, etc.). Further, the analysis section 303 analyzes a GPS signal provided from the position detection section 302, and determines the absolute position and the absolute bearing of the management apparatus 300. Then, the analysis section 303 provides information regarding the analysis results of these to the processing section 304.

The processing section 304 performs each piece of processing in the management apparatus 300. For example, the processing section 304 controls the communication section 305, and thereby causes information regarding an analysis result provided from the analysis section 303 to be transmitted to the management server 200. Thereby, the information processing apparatus 100 can perform output on the basis of the analysis result provided from the analysis section 303.

Further, the processing section 304 provides, to the communication section 305, the content of editing on control information, user information, regions, and histories inputted from the input section 307 by the user, and causes the content to be transmitted to the management server 200; and causes the content to be stored in the memory section 308. These pieces of processing are examples, and the processing section 304 may perform arbitrary processing.

Further, the processing section 304 controls the display section 306, and causes display content settled on the basis of various pieces of information to be displayed on the display section 306.

The communication section 305 performs communication with the management server 200. For example, in a case where the editing of control information, histories, and user information has been performed by the user, the communication section 305 transmits the editing content to the management server 200. Further, the communication section 305 performs the transmission and reception of control information, histories, and user information with the management server 200 at an arbitrary timing or a fixed timing, and thereby obtains synchronization with the management server 200.

The display section 306 displays a manipulation image for the user to manipulate the management apparatus 300 on a GUI, by being controlled by the processing section 304.

The input section 307 accepts various inputs from the user. For example, the content of editing on control information, user information, regions, and histories is inputted to the input section 307 by the user, and the input section 307 provides the editing content to the processing section 304.

The memory section 308 stores the various pieces of information described above. Specifically, the memory section 308 stores control information, user information, regions, histories, etc.

3. Details of Control Information

[3-1. Content of Set Control Information]

Hereinabove, the configuration of each apparatus is described. Next, the content of set control information is described using FIG. 2 and FIGS. 7 to 10.

As described above, control information is information in which a region, an action, and an output are linked. Then, if the information processing apparatus 100 detects the fact that the user is located in a region corresponding to control information and is performing an action corresponding to the control information, the information processing apparatus 100 performs an output linked to the region and the action.

In an embodiment of the present disclosure in which the conditions of regions and actions are set in control information, the conditions in which output is performed can be set more finely than in a case where only the conditions of actions are set in control information. Therefore, the user can cause the information processing apparatus 100 to perform an output more appropriate for the user. For example, the output of the information processing apparatus 100 can be varied between in a case where the user is reading a textbook at a desk and in a case where the user is reading a magazine in a living room.

Further, in control information, all of a region, an action, and an output may be set like in control information 10 of FIG. 2, or only a region and an action may be set like in control information 11. In a case where only a region and an action are set, the information processing apparatus 100 does not perform output even if it detects the fact that the user is located in a region corresponding to the control information and is performing an action corresponding to the control information.

Further, for the region in control information, "all the regions" may be set like in control information 12. In this case, if an action of the user corresponding to the control information is detected, the information processing apparatus 100 performs an output corresponding to the control information, regardless of the region where the user is located.

Further, for the action in control information, "all the actions" may be set like in control information 13. In this case, if the fact that the user is located in a region corresponding to the control information is detected, the information processing apparatus 100 performs an output corresponding to the control information, regardless of the action of the user.

Further, the user can edit control information. Specifically, the user can edit control information by inputting editing content from the input section 116 of the information processing apparatus 100 or the input section 307 of the management apparatus 300. Note that all pieces of control information may be newly added by the user, or control information set in advance may be edited by the user.

In an embodiment of the present disclosure in which the user can alter control information, the conditions in which output is performed can be made conditions more matched with the user's desire than in a case where control information is altered only by machine learning, for example. Therefore, the user can cause the information processing apparatus 100 to perform an output more appropriate for the user.

Further, the user can customize the region like in control information 14. For example, the user can newly add furniture and home electrical appliances that are newly installed, as regions in control information. Further, the user can newly add a prescribed region of a room as a zone. Further, the user can newly add fixed equipment at the timing of rebuilding or the like.

Further, the user can customize the action like in control information 14. For example, for an action of "utterance," the user can designate the content to be uttered (example: an utterance of "get tired," etc.).

Further, the user can customize the output like in control information 14. For example, for an output of "BGM playing," the user can designate the genre, artist, playing time, playing timing, sound volume, etc. of BGM.

By the region, the action, and the output of control information being customized, the user can set desired control information. Therefore, the user can cause the information processing apparatus 100 to perform an output more appropriate for the user.

Figure 7:
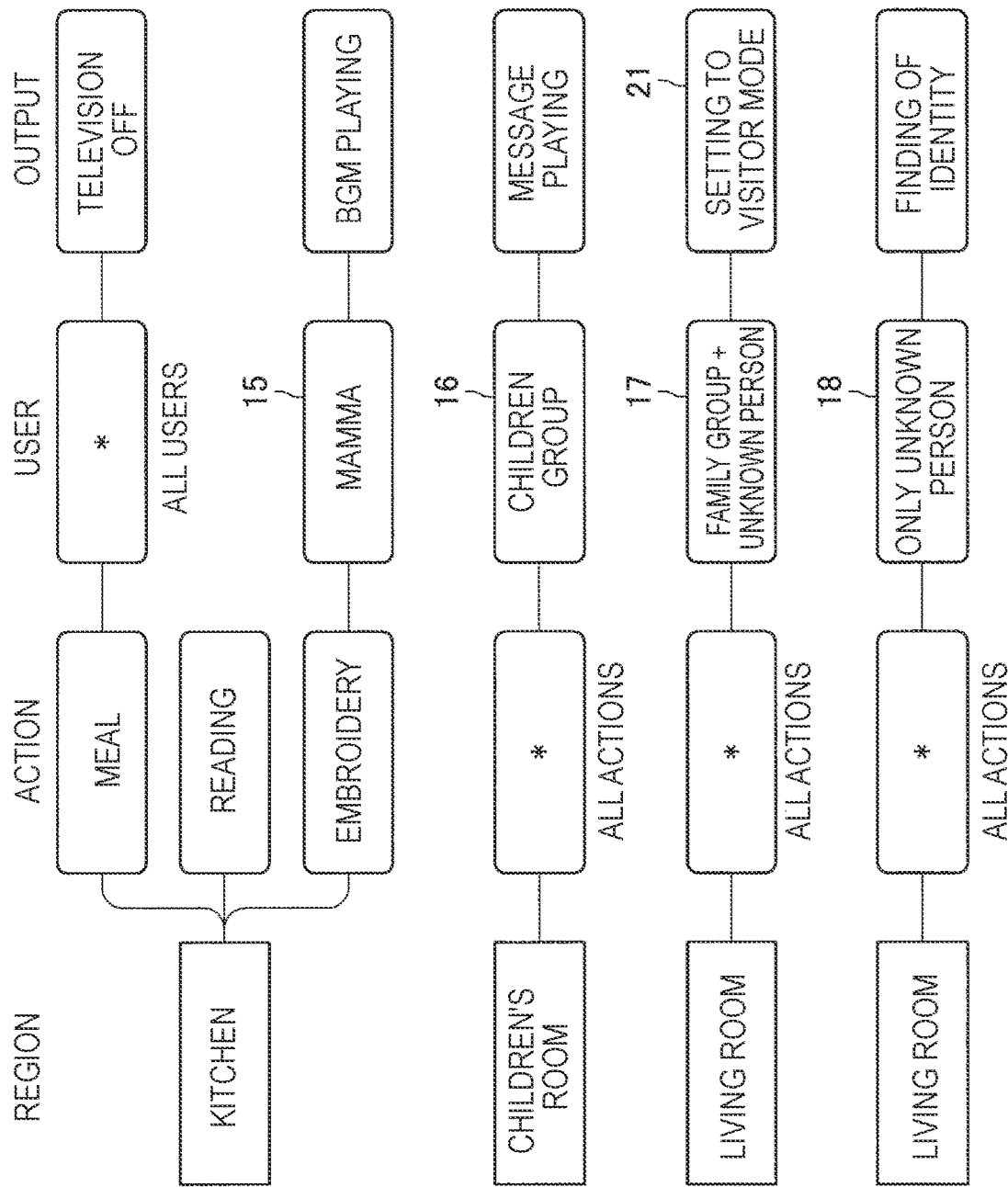
FIG. 7 is a diagram showing an example of a variation of control information.
Figure 8:
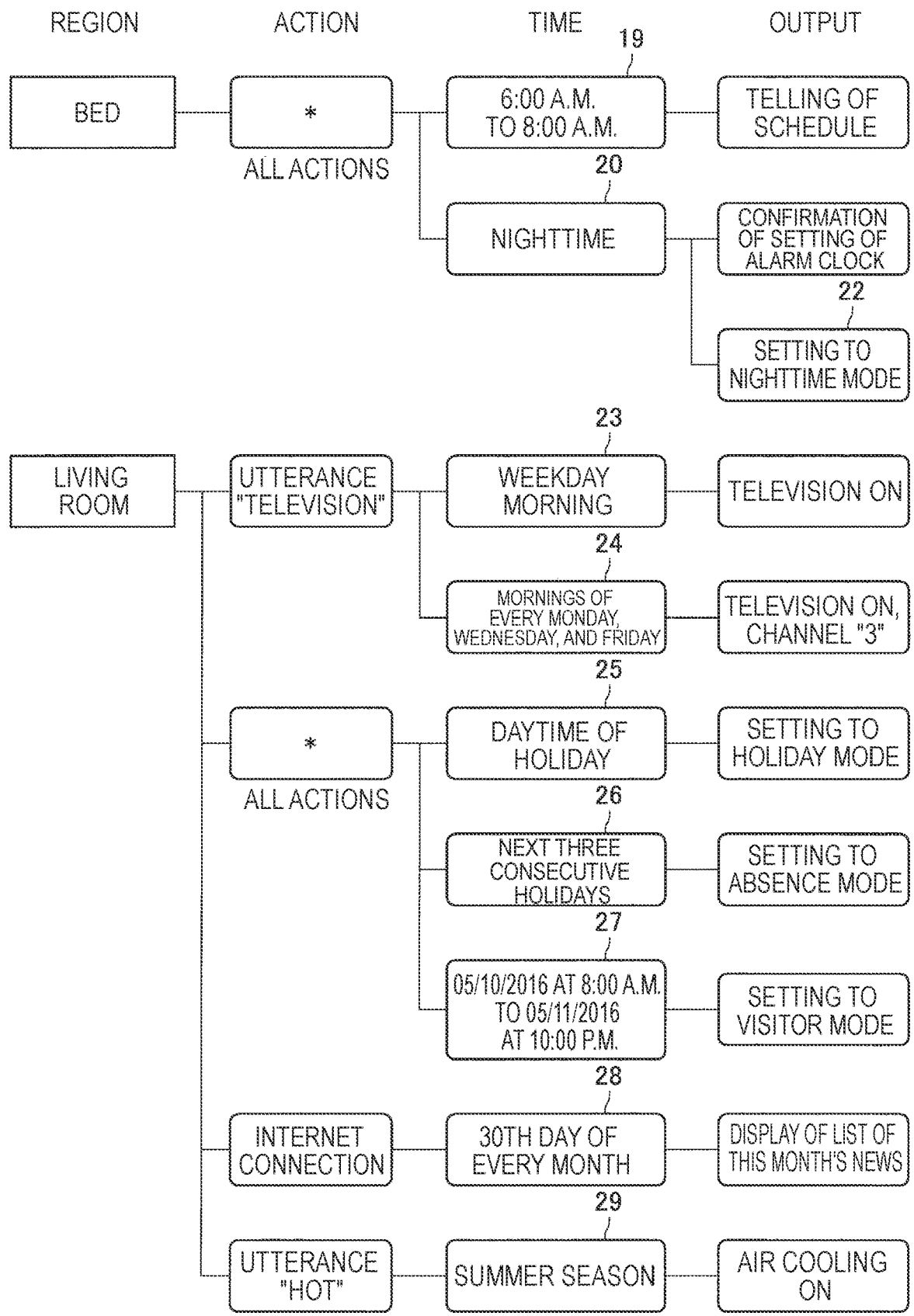
FIG. 8 is a diagram showing an example of a variation of control information.

Next, variations of control information are described with reference to FIGS. 7 and 8. FIGS. 7 and 8 are diagrams showing examples of variations of control information.

First, the control information shown in FIG. 7 is control information in which a "user" is added in addition to the region, the action, and the output. In this case, the information processing apparatus 100 performs output in a case where the conditions of the region, the action, and the user corresponding to control information are satisfied.

The method for designating the user of control information may be various. For example, like in control information 15 of FIG. 7, a specific individual (mamma, papa, a full name, etc.) may be set as the user of control information. Thereby, the information processing apparatus 100 can be used for a specific individual.

Further, like in control information 16, a group may be set as the user of control information. In this case, a group is created in advance by the user, and one or a plurality of users are registered as group members. Thereby, the management of control information can be facilitated. For example, in a case where there is a change in the group members, there is no need to change the control information (it is sufficient to change the group members).

Further, like in control information 17, a group (or a specific individual) and an unknown person may be set as the user of control information. In this case, the information processing apparatus 100 can perform an appropriate output also to a user not registered in the information processing apparatus 100. For example, at the time of having a visitor, it is possible to prevent private information of a family (in an enterprise, information for in-company use only) from being outputted by the information processing apparatus 100, or the like.

Further, like in control information 18, only an unknown person may be set as the user of control information. In this case, the information processing apparatus 100 can function also as an apparatus for guard. For example, in a case where the identity of an unknown person is found and the unknown person takes a questionable action, it is possible to notify the user or a guard company, or the like.

Next, the control information shown in FIG. 8 is control information in which "time" is added in addition to the region, the action, and the output. In this case, the information processing apparatus 100 performs output in a case where the conditions of the region, the action, and the time corresponding to control information are satisfied.

The method for designating the time of control information may be various. For example, as shown in FIG. 8, as the time of control information, a start time instant and a finish time instant such as "6:00 a.m. to 8:00 a.m." of control information 19 may be designated, or a concept indicating time such as "the nighttime" of control information 20 may be designated. Further, a concept indicating a specific date or period may be designated as the time of control information. For example, "a weekday morning" of control information 23, "the mornings of every Monday, Wednesday, and Friday" of control information 24, "the daytime of a holiday" of control information 25, "the next three consecutive holidays" of control information 26, "the 30th day of every month" of control information 28, "the summer season" of control information 29, etc. may be designated as the time of control information. Further, a specific date and a specific time instant may be designated as the time of control information. For example, "May 10, 2016 at 8:00 a.m. to May 11, 2016 at 10:00 p.m." of control information 27, etc. may be designated as the time of control information. The start time instant and the finish time instant, and the start period and the finish period that "the nighttime," "the morning," "the daytime," "the summer season," etc. described above refer to are set separately. Further, although not illustrated, a certain time instant (1:00 p.m., etc.) may be designated as the time of control information.

By the element of time being added to control information, the information processing apparatus 100 can perform output in accordance with the time (or) the time instant. For example, as shown in FIG. 8, for a user in a bed, the information processing apparatus 100 may tell the user the schedule of the day in the period of 6:00 a.m. to 8:00 a.m., and may demand a confirmation of the set time of an alarm clock from the user in the nighttime.

Further, like in control information 21 of FIG. 7 and control information 22 of FIG. 8, a mode may be set in the output of control information. The mode is information in which output content that the information processing apparatus 100 ought not to execute or output content that the information processing apparatus 100 may execute is defined. Here, the content of set modes is described with reference to FIG. 9. FIG. 9 is a diagram showing an example of mode setting.

FIG. 9 describes modes and output content that the information processing apparatus 100 ought not to execute in each mode. For example, in a nighttime mode, the information processing apparatus 100 ought not to execute BGM playing. Output content that the information processing apparatus 100 may execute may be defined in a similar manner to FIG. 9.

By the mode being set in the output of control information, the information processing apparatus 100 can perform output in accordance with the scene. For example, by the visitor mode shown in FIG. 9 being set in the output of control information, the information processing apparatus 100 can be prevented from running a slide show of family photographs.

Note that the information processing apparatus 100 may set the mode autonomously in accordance with detection results of various detection functions of the information processing apparatus 100. For example, in a case where an unknown person is detected by an analysis of the imaging analysis section 105, the information processing apparatus 100 may set the visitor mode.

Figure 10:
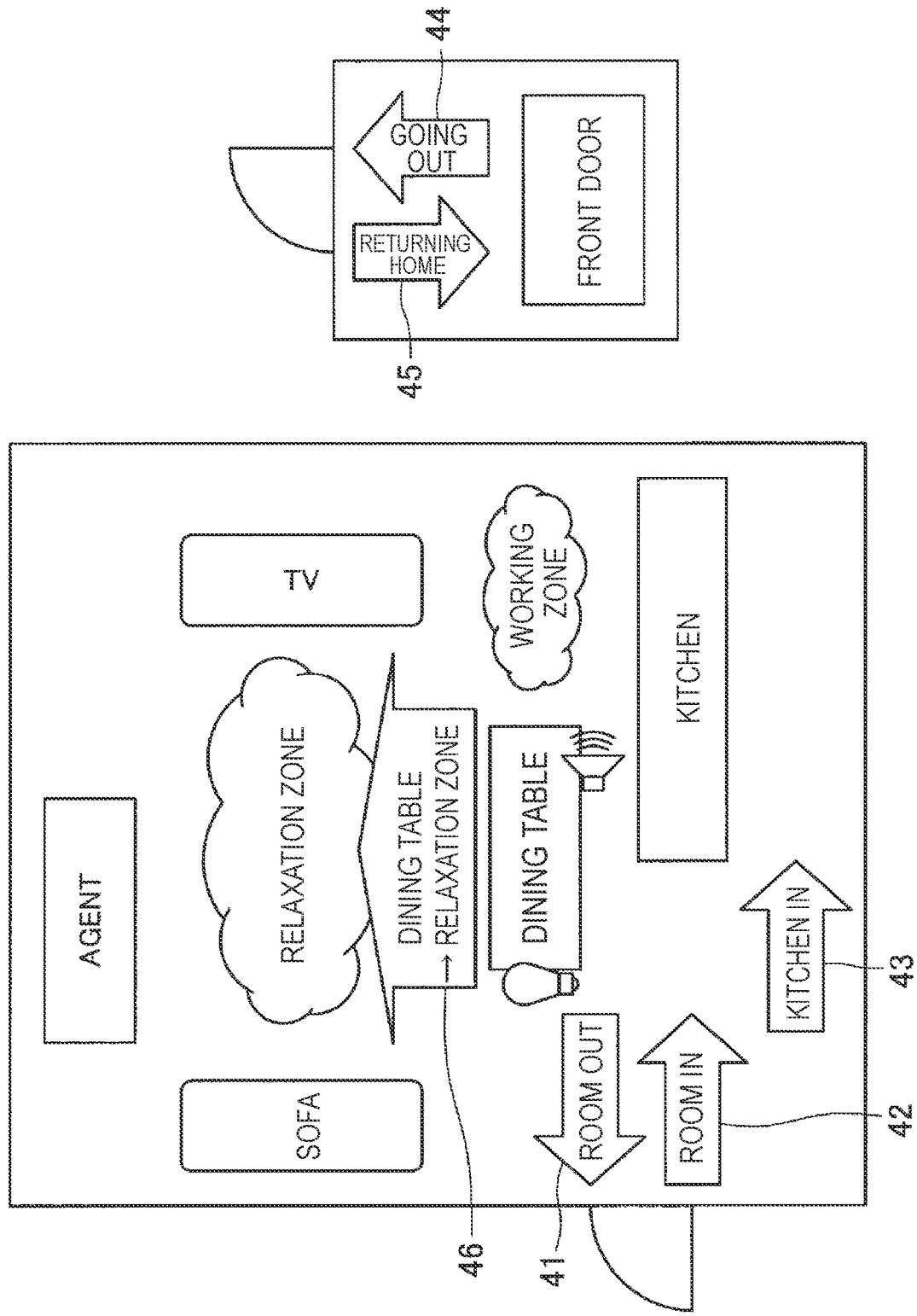
FIG. 10 is a diagram showing an example of a variation of control information.

Further, the region of control information may be information showing locomotion from a region to another region. Specifically, as shown in FIG. 10, the output content of the information processing apparatus 100 in a case where the user has entered a region ("Room IN," "Kitchen IN," and "Returning home" in FIG. 10) or in a case where the user has exited a region ("Room OUT" and "Going out" in FIG. 10) may be set in control information. Further, as shown in FIG. 10, the output content of the information processing apparatus 100 in a case where the user has locomoted from a region to another region (locomotion from a "dining table" to a "relaxation zone" in FIG. 10) may be set in control information.

Thereby, the information processing apparatus 100 can perform output in accordance with the path of flow of the user. Specifically, the information processing apparatus 100 can distinguish between the fact that the user is located in the relevant region and the movement of the user entering the relevant region.

Further, although not illustrated, the region of control information may not be a region in the plot where the information processing apparatus 100 is installed. For example, the region of control information may be the distance from the information processing apparatus 100 or a specific place (a company, a school, etc.). Thereby, the information processing apparatus 100 can control output to the management apparatus 300 by the information processing apparatus 100 acquiring information regarding the absolute position of the management apparatus 300. For example, it is assumed that a "company" is set as the region of control information and "notification off" is set as the output. In this case, in a case where, on the basis of the absolute position of the management apparatus 300, it is determined that the management apparatus 300 (the user holding it) exists in the company, the information processing apparatus 100 does not perform notification to the management apparatus 300.

Further, although not illustrated, the action of control information may be an action of the user obtained by an analysis of the management apparatus 300. Specifically, the action of control information may be an action of the user obtained from the acceleration detection section 301 of the management apparatus 300 (the user being at a stop, walking, running, on various transportation facilities, etc.). Thus, for example, it is assumed that "locomotion based on a train" is set as the action of control information and "notification off" is set as the output. In this case, in a case where, on the basis of information acquired by the management apparatus 300, it is determined that the management apparatus 300 (the user holding it) is locomoting on a train, the information processing apparatus 100 does not perform notification to the management apparatus 300.

[3-2. Methods for Setting Control Information]

Hereinabove, the content of set control information is described. Next, methods for setting control information are described. The setting of control information may be performed by various methods. The methods described below are examples of the methods.

First, a setting method based on a companion application is described. The user can set regions using an application (hereinafter, referred to as a "companion application") installed in the information processing apparatus 100 or the management apparatus 300.

The screen image of the companion application may be FIG. 2 or FIGS. 7 to 8. The method for setting control information using a companion application is arbitrary. For example, a method of arrangement by touch manipulation on a touch panel, and the like are given.

Next, a setting method based on hearing is described. Control information can be set by hearing from the information processing apparatus 100. For example, the information processing apparatus 100 puts the question of "What do you want to do when reading on the sofa?" If the user answers the question that "I want to listen to music," control information of set content in which the region is the "sofa," the action is "reading," and the output is "BGM playing" is added. The content of the question put from the information processing apparatus 100 may be various. Thereby, even a user with low IT literacy can perform the editing of control information easily.

Further, a proposal-type question may be put from the information processing apparatus 100 to the user actively. For example, in a case where an analysis by the imaging analysis section 105 has revealed that the user is studying and the power source of the television is on, the information processing apparatus 100) puts the question of "Would you like me to turn off the television when you are studying?" If the user answers "Yes" to the question, control information of set content in which the region is "all the regions (or the working zone, the desk, etc.)." the action is "study," and the output is "television off" is added. By a proposal-type question being put from the information processing apparatus 100, the user can easily make a decision of whether to perform the relevant setting or not. Further, by a question from a viewpoint that the user is not aware of being put, potential needs of the user can be caused to be reflected in control information.

[3-3. Operations of Information Processing Apparatus Based on Control Information]

Figure 11:
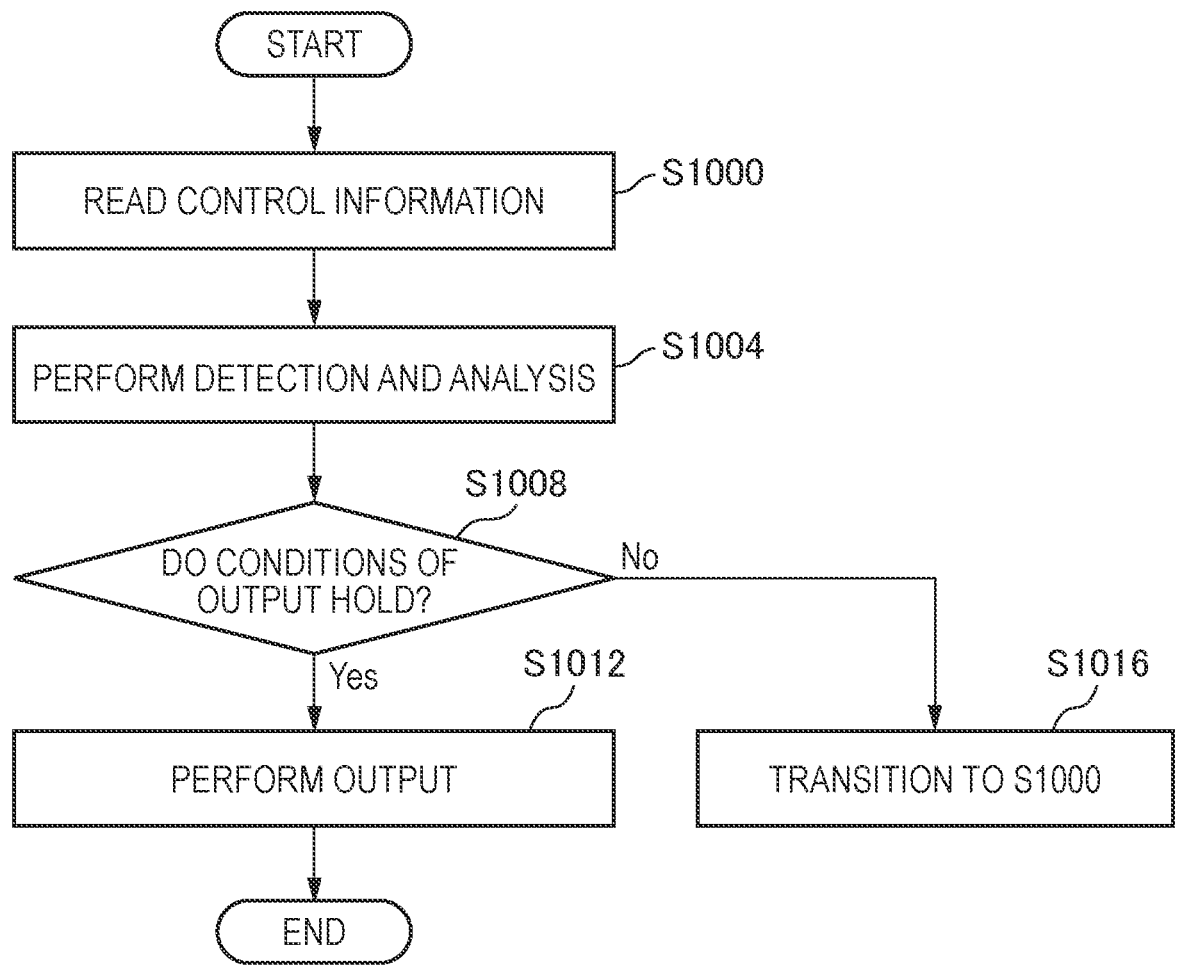
FIG. 11 is a flow chart showing an operation of an information processing apparatus based on control information.

Hereinabove, methods for setting control information are described. Next, operations of the information processing apparatus 100 based on control information are described with reference to FIG. 11. FIG. 11 is a flow chart showing an operation of the information processing apparatus 100 based on control information.

First, the processing section 106 of the information processing apparatus 100 acquires control information from the memory section 117, and performs the reading of the control information (step S1000). After that, the analysis section 103 analyzes a result of detection by the sound pickup section 101 or the imaging section 102 (step S1004); in a case where an analysis result corresponding to the conditions of control information is obtained (step S1008/Yes), the processing section 106 performs output (step S1012). In a case where an analysis result corresponding to the conditions of control information is not obtained (step S1008/No), the processing of step S1000 is performed (step S1016).

Here, the flow chart shown in FIG. 11 may be altered as appropriate. For example, in a case where an analysis result corresponding to the conditions of control information is not obtained (step S1008/No), the processing may not transition to step S1000, but transition to step S1004. That is, the processing section 106 may not perform the reading of control information each time of processing. Thereby, the load of the reading of control information by the processing section 106 can be reduced.

Further, an external device may perform detection processing and analysis processing in step S1004, and the information processing apparatus 100 may perform the processing of step S1008 and the subsequent steps on the basis of the analysis result. Thereby, an output based on a detection result in an area where the imaging section 102 and the sound pickup section 101 of the information processing apparatus 100 cannot perform detection, for example in an environment of another room or the like, can be performed.

[3-4. Setting of Regions]

Hereinabove, operations of the information processing apparatus 100 based on control information are described. Next, methods for setting regions are described. The setting of regions may be performed by various methods. The methods described below are examples of the methods.

Figure 12B:
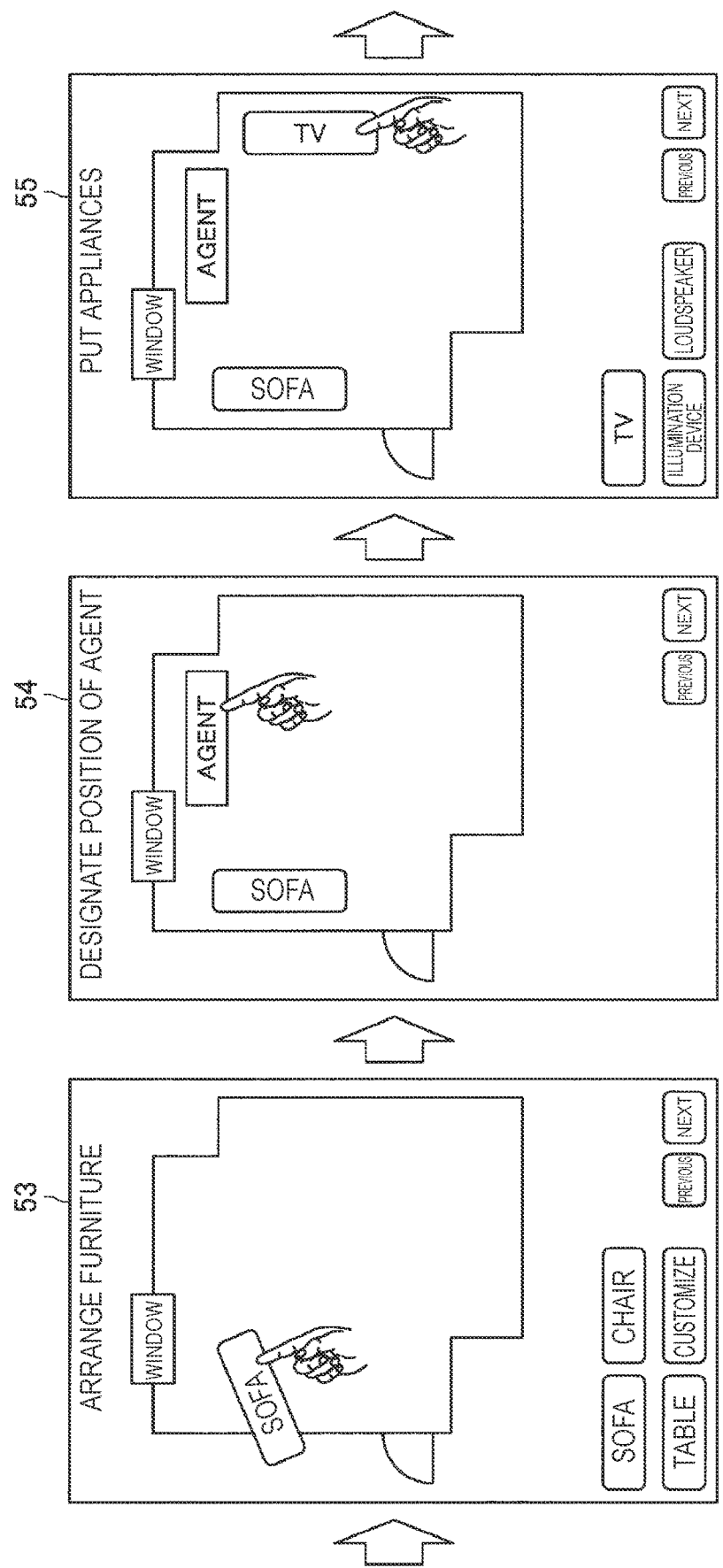
FIG. 12B is a diagram showing an example of region setting using a companion application.

First, setting based on a companion application is described. The user can set regions using a companion application installed in the information processing apparatus 100 or the management apparatus 300). Screen transitions of a companion application when setting regions will now be described with reference to FIGS. 12A to 12C. FIGS. 12A to 12C are diagrams showing an example of region setting using a companion application. Note that, in the following, a description is given on the assumption that the information processing apparatus 100 is used in a house.

First, the display section 108 displays a menu screen of a companion application by being controlled by the processing section 106 of the information processing apparatus 100 (screen 50). Next, the user sets an outline of a room via the input section 116 (screen 51). Next, the user arranges fixed equipment such as a window, a kitchen, and a closet via the input section 116 (screen 52).

Next, the user arranges furniture such as a sofa, a table, and a chair via the input section 116 (screen 53), places the information processing apparatus 100 (in the drawing, written as "AGENT") (screen 54), and arranges home electrical appliances such as a television, an illumination device, and a loudspeaker (screen 55). Then, the user sets zones such as a relaxation zone and a working zone via the input section 116 (screen 56); thus, the setting of regions is completed (screen 57). These screen transitions may be altered as appropriate. For example, the order of setting fixed equipment, furniture, the information processing apparatus 100, home electrical appliances, and zones may be changed as appropriate. Thereby, the user can set regions by intuitive manipulation.

Next, setting based on voices or captured images is described. The user can set regions by voices or captured images. Specifically, the information processing apparatus 100 can set regions by the analysis section 103 analyzing an audio signal acquired by the sound pickup section 101 or a captured image captured by the imaging section 102.

For example, the user says to the information processing apparatus 100, "There is a television on the right of you." The audio signal is subjected to semantic factoring by the voice analysis section 104, and the result of semantic factoring is provided to the processing section 106. In addition, a captured image is analyzed by the imaging analysis section 105, and the analysis result is provided to the processing section 106. On the basis of the result of semantic factoring of the audio signal and the analysis result of the captured image, the processing section 106 recognizes that the object located on the right of the information processing apparatus 100 is a television. Then, on the basis of the three-dimensional position and the direction of the television, the processing section 106 calculates the visual-audio region of the television.

Further, the user says to the information processing apparatus 100, "Here is a sofa." On the basis of the result of semantic factoring of the audio signal and the analysis result of the captured image, the processing section 106 recognizes that the object where the user is located is a sofa.

Further, the user points toward a table while saying to the information processing apparatus 100, "There is a table over there." On the basis of the result of semantic factoring of the audio signal and the analysis result of the captured image, the processing section 106 recognizes that the object on the extension line of the arm or finger of the user is a table. Thereby, even a user with low IT literacy can perform the addition of regions etc. easily.

Next, setting based on captured images is described. Regions may be set by captured images being analyzed. Specifically, the imaging analysis section 105 analyzes captured images acquired by the imaging section 102 of the information processing apparatus 100, and calculates the three-dimensional coordinates of walls, fixed equipment, furniture, and home electrical appliances. Then, the imaging analysis section 105 calculates the degree of similarity by pattern matching with an object image registered in advance, determines the object on the basis of the degree of similarity, and sets a region for the object. Note that, in a case where an object cannot be determined by the method described above, information showing what the object is may be added by the user.

Thereby, for example, in a case where furniture, home electrical appliances, etc. have been newly installed or rearranged, the information processing apparatus 100 can set regions autonomously; thus, the load with which the user edits regions can be reduced.

Next, setting based on an inquiry from the information processing apparatus S100) is described. Regions may be set by making an inquiry from the information processing apparatus 100 to the user actively. For example, in a case where the region where the user is located cannot be determined on the basis of the analysis result of a captured image, the information processing apparatus 100 asks the user the question of "Where are you sitting?" The user answers the question that "I am on a sofa" or the like, and thereby the information processing apparatus 100 can recognize that the object that the user is sitting on is a sofa, and can add the sofa as a region.

In this case, the information processing apparatus 100 may also ask the user the question of "Are you sitting on a sofa?" The user answers "Yes" or the like to the question, and thereby the information processing apparatus 100 can add the sofa as a region similarly to the above.

Further, the information processing apparatus 100 may also question the user about the position of an object by putting the question of "Would you tell me the position of the sofa?" or the like. The information processing apparatus 100 may determine the sofa and add it as a region by, to the question, the user taking an action such as pointing toward the sofa while uttering.

<4. Use of Histories>

Figure 13:
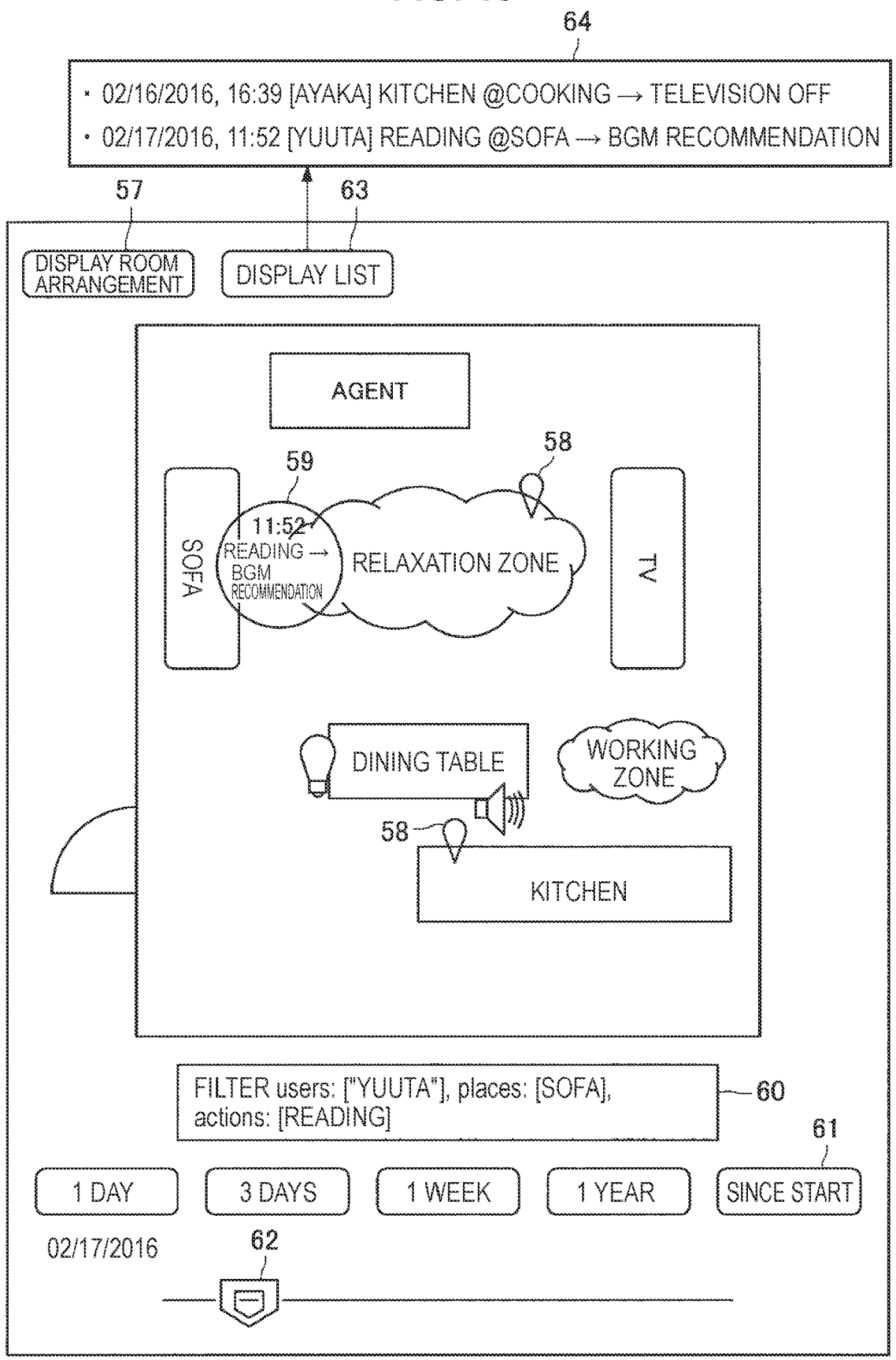
FIG. 13 is a diagram showing an example of history display using a companion application.

Hereinabove, methods for setting regions are described. Next, the use of histories is described with reference to FIG. 13. FIG. 13 is a diagram showing an example of history display using a companion application.

As shown in FIG. 13, the user can check information regarding histories by using a companion application. Specifically, using a companion application, the user can check regions where users are located, actions of users, output content of the information processing apparatus 100, and information determining users (mamma, papa, full names, etc.) at time instants. An example of the method for manipulating a companion application will now be described.

If a room arrangement display button 57 is pushed in a companion application, an overview diagram of an outline of a room, fixed equipment, furniture, and home electrical appliances or zones is displayed. Then, a history of desired conditions can be exclusively extracted using a filter function 60. Specifically, the user can acquire a history of desired conditions by performing filtering on histories using a time instant, a region where a user is located, an action of a user, output content of the information processing apparatus 100, or information determining a user. In the example shown in FIG. 13, filtering is performed on the assumption that the user is "Yuuta." the region where the user is located is a "sofa," and the action of the user is "reading."

Further, the period of a history to be extracted can be designated by using period designation buttons 61. In the example shown in FIG. 13, a history of one day before is extracted. Furthermore, the time of a history to be displayed can be designated by using a slider 62.

Then, history objects 58 are displayed in the overview diagram, and thereby regions where the history exists are shown. If a history object 58 is selected by the user, details of the history are displayed as a history detail object 59. In the example shown in FIG. 13, the history detail object 59 shows that, at 11:52, the user was reading on the sofa and the information processing apparatus 100 performed an output of recommending BGM. As a matter of course, the history detail object 59 may include information determining the user. Thus, a history is displayed on the room arrangement (a region), and therefore the action and the path of flow of the user can be imagined easily.

Note that, if a list display button 63 is pushed, a list of histories 64 is displayed. Thereby, the user can acquire histories without performing the manipulation of the slider 62, the selection of a history object 58, etc. Further, the user can process and search list data of histories easily.

Figure 14:
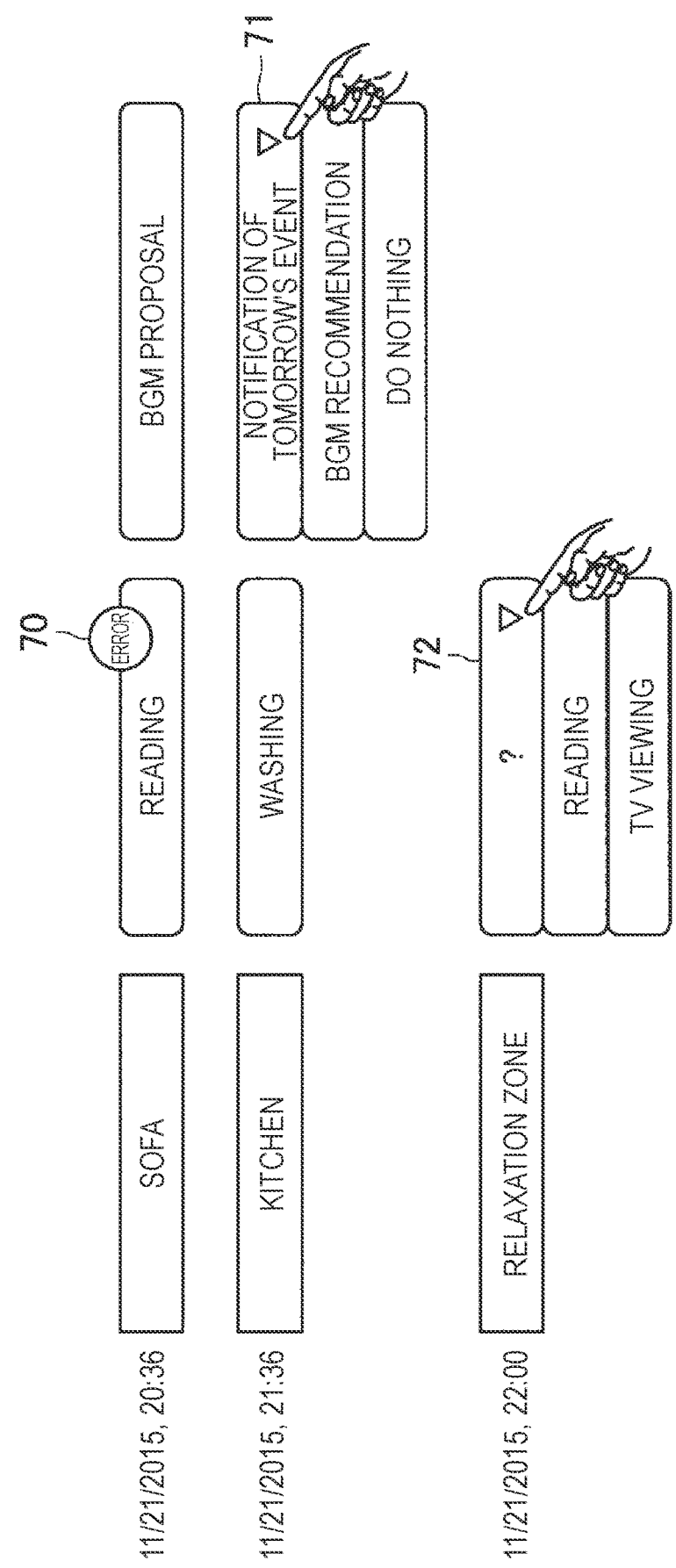
FIG. 14 is a diagram showing an example of history utilization.

Next, the input of a correction of a history, an amendment of a history, and an alteration of control information based on a history are described with reference to FIG. 14. FIG. 14 is a diagram showing an example of history utilization.

The user can check information regarding histories by using a companion application. Then, as shown in FIG. 14, the user can add an error flag 70 in a case where there is an error in a history. In the example shown in FIG. 14, by adding an error flag 70 to an action of the user of "reading," the user can show that the user took an action other than reading. Although in this example the error flag 70 is added to the action, the error flag 70 may be added to the date and time, or the region. Further, the user may not only add the error flag 70, but also input correct information.

Further, as shown in FIG. 14, in a case where there is undetermined information in a history, the user can amend the information to correct information by using a pulldown list 72. In the example shown in FIG. 14, the user has amended an action. As a matter of course, the date and time, or the region may be amended. Further, the user may make an amendment not using the pulldown list 72 but using a text box or the like.

The information of such a correction of a history or such an amendment of a history is used for the improvement of analysis algorithms. Specifically, these pieces of information are transmitted to the management server 200, and the analysis algorithm management section 207 performs machine learning on the basis of these pieces of information, and thereby improves analysis algorithms.

The improved analysis algorithms (or programs created on the basis of the improved analysis algorithms) are provided to the information processing apparatus 100. Thereby, the precision of analysis processing of the analysis section 103 of the information processing apparatus 100 can be improved. Here, an analysis algorithm or a program improved for detection processing that is not exclusively for a specific user, such as the processing of detecting the position or the processing of detecting the action, may be provided to information processing apparatuses 100 other than the information processing apparatus 100 held by the user. Further, an analysis algorithm or a program improved for processing that is exclusively for a specific user, such as the processing of determining the user, may be provided exclusively to the information processing apparatus 100 held by the user. By the above method, the precision of analysis processing of the information processing apparatus 100 can be improved on the basis of feedback from the user.

Further, as shown in FIG. 14, the user can alter control information on the basis of a history by using a pulldown list 71. In the example shown in FIG. 14, the user is about to alter an output of "notification of tomorrow's event" corresponding to the region of a "kitchen" and the action of "washing" to another output. As a matter of course, the user may alter control information not using the pulldown list 71 but using a text box or the like. Thus, the user can edit control information in parallel with the working of checking histories, and therefore the failure of the user's working can be reduced.

5. Hardware Configuration of Information Processing Apparatus

Hereinabove, an embodiment of the present disclosure is described. Next, a hardware configuration example of the information processing apparatus 100 according to an embodiment of the present disclosure is described.

Figure 15:
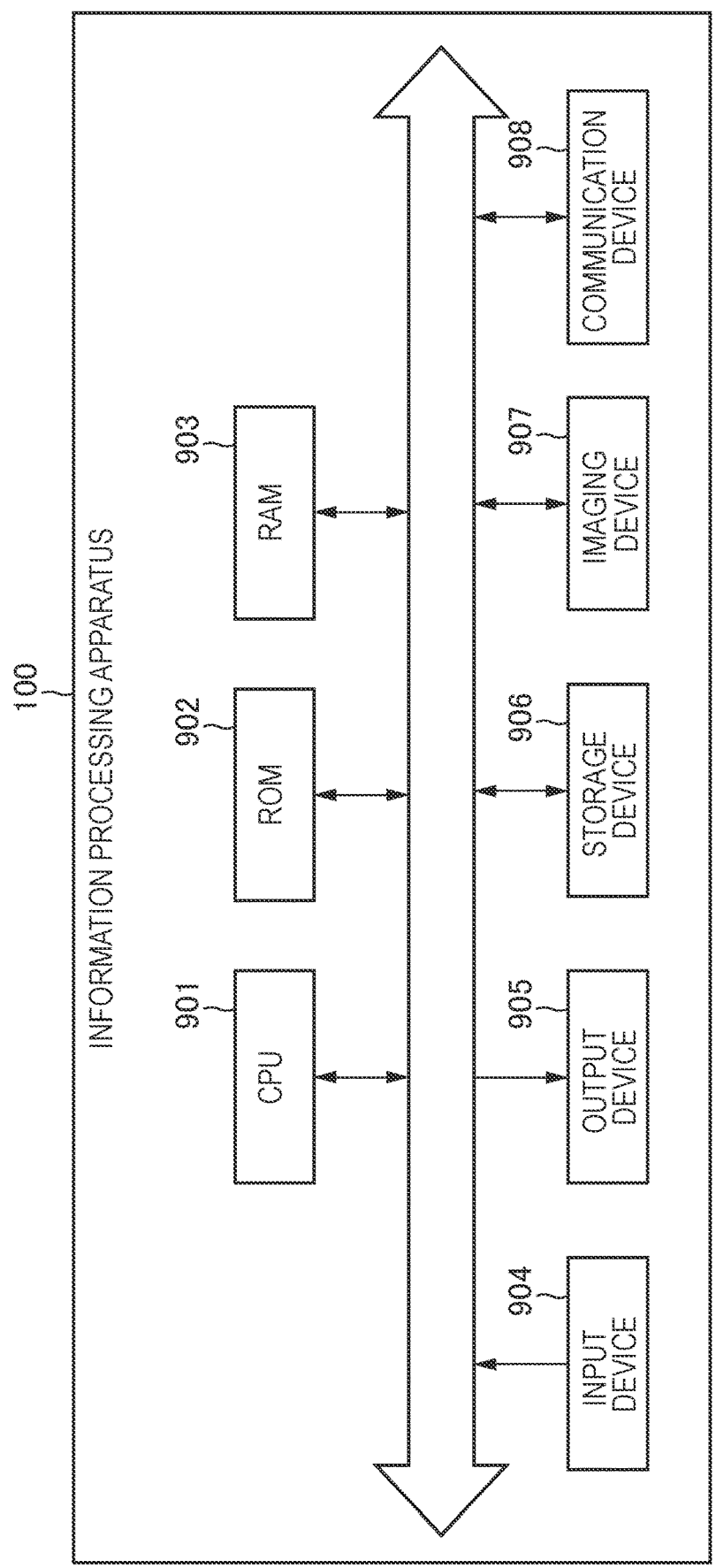
FIG. 15 is a diagram showing a hardware configuration of an information processing apparatus according to an embodiment of the present disclosure.

FIG. 15 is a diagram showing a hardware configuration of the information processing apparatus 100 according to an embodiment of the present disclosure. As shown in FIG. 15, the information processing apparatus 100 includes a central processing unit (CPU) 901, a read-only memory (ROM) 902, a random access memory (RAM) 903, an input device 904, an output device 905, a storage device 906, an imaging device 907, and a communication device 908.

The CPU 901 functions as an arithmetic processing device and a control device, and controls the overall operation in the information processing apparatus 100 in accordance with various programs. Further, the CPU 901 may be a microprocessor. The ROM 902 stores programs, operating parameters, etc. to be used by the CPU 901. The RAM 903 temporarily stores programs to be used in the execution of the CPU 901, parameters that change in the execution as appropriate, etc. These are mutually connected by a host bus including a CPU bus or the like. The functions of the analysis section 103, the processing section 106, and the management section 111 are obtained mainly by the cooperation of the CPU 901, the ROM 902, the RAM 903, and a software application.

The input device 904 includes an input means for the user inputting information, such as a mouse, a keyboard, a touch panel, buttons, a microphone, a switch, and a lever, and an input control circuit or the like that generates an input signal on the basis of input by the user and outputs the input signal to the CPU 901. By manipulating the input device 904, the user of the information processing apparatus 100 can input various data to the information processing apparatus 100, and can instruct the information processing apparatus 100 on processing operations. The input device 904 corresponds to the sound pickup section 101 and the input section 116.

The output device 905 includes, for example, a display device such as a liquid crystal display (LCD) device, an OLED device, a see-through display, or a lamp. Furthermore, the output device 905 includes voice output devices such as a loudspeaker and a headphone. For example, the output device 905 displays captured images, generated images, etc. On the other hand, the voice output device converts voice data or the like to a voice, and outputs the voice. The output device 905 corresponds to the sound emitting section 107, the display section 108, and the light emitting section 109.

The storage device 906 is a device for data storage. The storage device 906 may include a storage medium, a recording device that records data on the storage medium, a readout device that reads out data from the storage medium, a deletion device that deletes data recorded on the storage medium, etc. The storage device 906 stores programs to be executed by the CPU 901 and various data. The storage device 906 corresponds to the memory section 117.

The imaging device 907 includes an imaging optical system that collects light, such as a photographing lens and a zoom lens, and a signal conversion element such as a charge-coupled device (CCD) or a complementary metal oxide semiconductor (CMOS) device. The imaging optical system collects light emitted from a subject and forms a subject image in a signal conversion section, and the signal conversion element converts the formed subject image to an electrical image signal. The imaging device 907 corresponds to the imaging section 102.

The communication device 908 is, for example, a communication interface including a communication device or the like for connection to a communication network. Further, the communication device 908 may include a communication device compatible with a wireless local area network (LAN), a communication device compatible with Long-Term Evolution (LTE), a wire communication device that performs communication via wire, or a Bluetooth (registered trademark) communication device. The communication device 908 corresponds to the communication section 110.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although determining a user or an object is described in the one embodiment described above, a living thing, such as a pet, may be determined. The method for determining a living thing may use a determining method based on pattern matching similar to the method for determining a user or an object.

By the information processing apparatus 100 determining a living thing such as a pet, in a case where, for example, the user and the pet are in the same room, the information processing apparatus 100 may perform an output such as executing a slide show of captured images of the pet. Further, the information processing apparatus 100 may notify the user of the situation of the pet by notifying a captured image of the pet captured by the imaging section 102 to the management apparatus 300.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing apparatus including:
a memory section configured to store control information in which a region, an action, and content of control of apparatus output are associated; and
a processing section configured to perform output on a basis of a region where a user is located, an action of the user, and the control information.

(2)
The information processing apparatus according to (1), further including:
an acquisition section configured to acquire input by a user of the region, the action, and the output; and
a setting section configured to set the control information on a basis of the input by the user acquired by the acquisition section.

(3)
The information processing apparatus according to (2), in which the region is a region in a plot where the information processing apparatus is installed.

(4)
The information processing apparatus according to (3), in which the region is a region in a room included in a building.

(5)
The information processing apparatus according to (4), further including:
a region management section configured to define one or two or more regions in the room,
in which the acquisition section acquires a region selected by the user from the one or two or more regions, as input by the user.

(6)
The information processing apparatus according to (5), in which the region management section defines the one or two or more regions on a basis of input by the user.

(7)
The information processing apparatus according to (6), in which the region management section defines the one or two or more regions on a basis of a diagram including one or two or more objects depicted or arranged by the user.

(8)
The information processing apparatus according to (6), in which the region management section defines the one or two or more regions on a basis of voice of the user.

(9) The information processing apparatus according to (5), further including:

an imaging section, in which the region management section defines the one or two or more regions by analyzing a captured image obtained by the imaging section.

(10) The information processing apparatus according to (5), in which the one or two or more regions are one or two or more regions corresponding to furniture, home electrical appliances, or fixed equipment.

(11) The information processing apparatus according to (1), in which the user is a specific user, a group including the specific user, or a user who is not the specific user.

(12) The information processing apparatus according to any one of (1) to (11), in which the region and the action included in the control information are information regarding entering and exiting to/from the region.

(13) The information processing apparatus according to any one of (1) to (11), in which the region and the action included in the control information are information regarding locomotion from a first region to a second region.

(14) The information processing apparatus according to (2), in which the acquisition section acquires input by voice of a user of the region, the action, and the output, and the setting section sets the control information on a basis of the input by the voice of the user acquired by the acquisition section.

(15) The information processing apparatus according to any one of (1) to (14), in which the memory section stores a history regarding processing of the information processing apparatus, and the information processing apparatus further includes a history editing section configured to acquire input by a user regarding a correction or an amendment of the history.

(16) A program for causing a computer to execute:

a function of storing control information in which a region, an action, and content of control of apparatus output are associated; and a function of performing output on a basis of a region where a user is located, an action of the user, and the control information.

(17) A processing method to be executed by a computer, including:

storing control information in which a region, an action, and content of control of apparatus output are associated; and performing output on a basis of a region where a user is located, an action of the user, and the control information.

REFERENCE SIGNS LIST 100 information processing apparatus
101 sound pickup section
102 imaging section
103 analysis section
104 voice analysis section
105 imaging analysis section
106 processing section
107 sound emitting section
108 display section
109 light emitting section
110 communication section
111 management section
112 control information management section
113 user management section
114 region management section
115 history management section
116 input section
117 memory section
200 management server
300 management apparatus
410, 420 network

The invention claimed is:

1. An information processing apparatus comprising:

an acquisition section configured to acquire input by a user of a set region regarding a location of the user, a set action, and set content of control of apparatus output to be stored as control information;

a setting section configured to set the control information based on the input by the user acquired by the acquisition section;

a memory section configured to store the control information in which the set region regarding the location of the user, the set action, and the set content of control of the apparatus output are associated; and a processing section configured to perform output based on a detected region where the user is located, a detected action of the user while the user is located in the detected region, and the set content of the control of the apparatus output stored in the control information associated with the set region corresponding to the detected region and the set action corresponding to the detected action, wherein the set region is one of a plurality of regions within a room included in a building, wherein the memory section is implemented via at least one non-transitory computer-readable storage medium, and wherein the acquisition section, the setting section, and the processing section are each implemented via at least one processor.

2. The information processing apparatus according to claim 1, wherein the set region is in a plot where the information processing apparatus is installed.

3. The information processing apparatus according to claim 1, wherein the acquisition section acquires input by voice of the user of the set region, the set action, and the set content of the control of the apparatus output, and the setting section sets the control information based on the input by the voice of the user acquired by the acquisition section.

4. The information processing apparatus according to claim 1, wherein the user is identified as a specific user, a group including the specific user, or another user who is not the specific user.

5. The information processing apparatus according to claim 1, wherein the region and the action included in the control information are information regarding the user entering or exiting the region.

6. The information processing apparatus according to claim 1,
wherein the set region and the set action included in the control information are information regarding locomotion of the user from a first region to a second region.

7. The information processing apparatus according to claim 1,
wherein the memory section is further configured to store a history regarding processing of the information processing apparatus,
wherein the information processing apparatus further comprises a history editing section configured to acquire input by the user regarding a correction or an amendment of the stored history, and
wherein the history editing section is implemented via at least one processor.

8. The information processing apparatus according to claim 1,
wherein the stored control information includes at least one identity of the user associated with the set region, the set action, and the set content of the control of the apparatus output, and
wherein the processing section performs the output further based on the at least one identity of the user that performs the detected action.

9. The information processing apparatus according to claim 2, further comprising:
a region management section configured to define the plurality of regions within the room,
wherein the acquisition section acquires a region selected by the user from the plurality of regions, as the input by the user, and
wherein the region management section is implemented via at least one processor.

10. The information processing apparatus according to claim 9,
wherein the region management section defines the plurality of regions based on the input by the user.

11. The information processing apparatus according to claim 10,
wherein the region management section defines the plurality of regions based on a diagram including one or more objects depicted or arranged by the user in relation to each region of the plurality of regions.

12. The information processing apparatus according to claim 10,
wherein the region management section defines the plurality of regions based on voice of the user as the input.

13. The information processing apparatus according to claim 9, further comprising:
an imaging section,
wherein the region management section defines the plurality of regions by analyzing a captured image obtained by the imaging section, and
wherein the imaging section is implemented via an imaging optical system.

14. The information processing apparatus according to claim 9,
wherein the plurality of regions correspond to furniture, home electrical appliances, or fixed equipment.

15. A non-transitory computer-readable storage medium having embodied thereon a program, which when executed by a computer causes the computer to execute a method, the method comprising:
acquiring input by a user of a set region regarding a location of the user, a set action, and set content of control of apparatus output to be stored as control information;
setting the control information based on the acquired input by the user;
storing the control information in which the set region regarding the location of the user, the set action, and the set content of control of the apparatus output are associated; and
performing output based on a detected region where the user is located, a detected action of the user while the user is located in the detected region, and the set content of the control of the apparatus output stored in the control information associated with the set region corresponding to the detected region and the set action corresponding to the detected action,
wherein the set region is one of a plurality of regions within a room included in a building.

16. A processing method to be executed by a computer, comprising:
acquiring input by a user of a set region regarding a location of the user, a set action, and set content of control of apparatus output to be stored as control information;
setting the control information based on the acquired input by the user;
storing the control information in which the set region regarding the location of the user, the set action, and the set content of control of the apparatus output are associated; and
performing output based on a detected region where the user is located, a detected action of the user while the user is located in the detected region, and the set content of the control of the apparatus output stored in the control information associated with the set region corresponding to the detected region and the set action corresponding to the detected action,
wherein the set region is one of a plurality of regions within a room included in a building.

* * * * *